(12) United States Patent
Hong et al.

(10) Patent No.: US 10,701,575 B2
(45) Date of Patent: Jun. 30, 2020

(54) METHOD AND APPARATUS FOR EFFICIENTLY TRANSMITTING AND RECEIVING DATA IN A WIRELESS COMMUNICATION SYSTEM

(71) Applicant: Samsung Electronics Co., Ltd., Gyeonggi-do (KR)

(72) Inventors: Sungnam Hong, Suwon-si (KR); Hyunil Yoo, Suwon-si (KR); Taeyoung Kim, Seoul (KR); Hyunseok Ryu, Yongin-si (KR); Jiyun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 15/694,702

(22) Filed: Sep. 1, 2017

(65) Prior Publication Data
US 2018/0070255 A1    Mar. 8, 2018

(30) Foreign Application Priority Data

Sep. 2, 2016 (KR) .......................... 10-2016-0113188

(51) Int. Cl.
*H04W 24/08* (2009.01)
*H04L 5/00* (2006.01)
*H04W 72/04* (2009.01)
*H04W 88/02* (2009.01)

(52) U.S. Cl.
CPC .......... *H04W 24/08* (2013.01); *H04L 5/0053* (2013.01); *H04L 5/0091* (2013.01); *H04W 72/048* (2013.01); *H04L 5/0057* (2013.01); *H04W 88/02* (2013.01)

(58) Field of Classification Search
CPC ... H04L 5/0053; H04L 5/0057; H04L 5/0091; H04W 24/08; H04W 72/048; H04W 88/02; H04W 72/08–087; H04W 72/04–14
See application file for complete search history.

(56) References Cited

U.S. PATENT DOCUMENTS

| 8,730,866 | B2* | 5/2014 | Adachi | H04W 72/1231 370/252 |
| 8,938,016 | B1* | 1/2015 | Ben-Eli | H04L 27/0012 375/260 |
| 9,154,282 | B2* | 10/2015 | Nangia | H04L 5/0053 |
| RE46,775 | E * | 4/2018 | Oshima | |
| 10,142,946 | B2* | 11/2018 | Choi | H04W 52/383 |
| 2008/0037413 | A1* | 2/2008 | Gu | H04W 52/56 370/210 |

(Continued)

FOREIGN PATENT DOCUMENTS

KR    20150027690 A    3/2015

*Primary Examiner* — Dung B Huynh

(57) ABSTRACT

The present disclosure relates to a pre-5th-generation (5G) or 5G communication system to be provided for supporting higher data rates beyond 4th-generation (4G) communication system such as long term evolution (LTE). The present disclosure relates to a method for transmitting and receiving a data. A method of a terminal according to the present disclosure includes: generating a signal; identifying a category of the terminal; mapping the generated signal to a resource using resource mapping information determined based on the category of the terminal; and transmitting the signal using the mapped resource.

20 Claims, 18 Drawing Sheets

(56) References Cited

U.S. PATENT DOCUMENTS

| | | | |
|---|---|---|---|
| 2008/0261645 A1* | 10/2008 | Luo | H04W 52/24 455/522 |
| 2009/0010357 A1* | 1/2009 | Kogawa | H04L 27/2607 375/295 |
| 2009/0047984 A1* | 2/2009 | Gollamudi | H04W 72/048 455/513 |
| 2009/0075667 A1* | 3/2009 | Bourlas | H04L 1/1861 455/452.1 |
| 2009/0268856 A1* | 10/2009 | Okazaki | H03J 1/0008 375/343 |
| 2010/0041430 A1* | 2/2010 | Ishii | H04L 5/0075 455/522 |
| 2010/0061345 A1* | 3/2010 | Wengerter | H04L 1/0004 370/335 |
| 2010/0130245 A1* | 5/2010 | Iseda | H04L 1/0001 455/522 |
| 2010/0246455 A1* | 9/2010 | Nangia | H04L 1/1822 370/280 |
| 2010/0279701 A1* | 11/2010 | Chen | H04L 1/0002 455/452.2 |
| 2010/0297993 A1* | 11/2010 | Heo | H04W 52/365 455/423 |
| 2011/0081933 A1* | 4/2011 | Suh | G01S 5/0236 455/509 |
| 2011/0275396 A1* | 11/2011 | Nishio | H04B 7/0615 455/509 |
| 2012/0009967 A1* | 1/2012 | Kawasaki | H04W 72/1205 455/509 |
| 2012/0021702 A1* | 1/2012 | Liu | H04W 52/0251 455/90.2 |
| 2012/0039205 A1* | 2/2012 | Kogure | H04W 52/367 370/252 |
| 2012/0039292 A1* | 2/2012 | Lee | H04L 27/2607 370/329 |
| 2012/0046060 A1* | 2/2012 | Katayama | H04L 5/0037 455/513 |
| 2012/0195273 A1* | 8/2012 | Iwamura | H04W 72/1252 370/329 |
| 2012/0195286 A1* | 8/2012 | Kim | H04L 5/0007 370/330 |
| 2012/0275425 A1* | 11/2012 | Li | H04W 52/20 370/329 |
| 2013/0070696 A1* | 3/2013 | Tang | H04W 52/146 370/329 |
| 2013/0077506 A1* | 3/2013 | Hu | H04W 72/0473 370/252 |
| 2013/0107785 A1* | 5/2013 | Bhattad | H04J 11/005 370/312 |
| 2013/0155974 A1* | 6/2013 | Papasakellariou | H04W 72/042 370/329 |
| 2013/0159554 A1* | 6/2013 | Kim | H04W 56/0055 709/248 |
| 2013/0258935 A1* | 10/2013 | Zhang | H04W 72/005 370/312 |
| 2013/0308572 A1* | 11/2013 | Sayana | H04W 72/048 370/329 |
| 2014/0016677 A1* | 1/2014 | Dua | H04L 25/0216 375/148 |
| 2014/0078881 A1* | 3/2014 | Lopez | H04J 3/1694 370/210 |
| 2014/0198761 A1* | 7/2014 | Hooli | H04W 72/08 370/329 |
| 2014/0341052 A1* | 11/2014 | Devarasetty | H04W 24/08 370/252 |
| 2015/0016428 A1* | 1/2015 | Narasimha | H04L 5/0058 370/336 |
| 2015/0098532 A1* | 4/2015 | Ryu | H04L 5/001 375/347 |
| 2015/0131579 A1* | 5/2015 | Li | H04L 1/08 370/329 |
| 2015/0131749 A1* | 5/2015 | Slomina | H04J 11/005 375/260 |
| 2015/0146644 A1* | 5/2015 | Kim | H04L 5/0048 370/329 |
| 2015/0195077 A1* | 7/2015 | Kim | H04L 5/0833 370/329 |
| 2015/0201431 A1* | 7/2015 | Um | H04L 5/0048 370/280 |
| 2015/0208366 A1* | 7/2015 | Papasakellariou | H04W 74/0833 370/311 |
| 2015/0263818 A1* | 9/2015 | Guo | H04L 5/0073 370/329 |
| 2015/0327231 A1* | 11/2015 | Wang | H04J 11/00 370/329 |
| 2015/0358801 A1* | 12/2015 | Seo | H04W 8/005 370/329 |
| 2015/0358924 A1* | 12/2015 | Papasakellariou | H04W 52/346 370/329 |
| 2015/0358966 A1* | 12/2015 | Zheng | H04W 72/0446 370/329 |
| 2016/0066255 A1* | 3/2016 | Marinier | H04W 48/16 370/350 |
| 2016/0100398 A1* | 4/2016 | Xia | H04W 72/0413 370/330 |
| 2016/0205611 A1* | 7/2016 | Kobayashi | H04W 40/12 455/445 |
| 2016/0227580 A1* | 8/2016 | Xiong | H04W 76/18 |
| 2016/0242103 A1* | 8/2016 | Mindru | H04J 11/0079 |
| 2016/0286435 A1* | 9/2016 | Zhang | H04W 4/50 |
| 2016/0294595 A1* | 10/2016 | Harada | H04L 27/2646 |
| 2016/0352551 A1* | 12/2016 | Zhang | H04L 27/2602 |
| 2016/0352554 A1* | 12/2016 | Mizusawa | H04W 24/08 |
| 2016/0360500 A1* | 12/2016 | Kim | H04B 17/318 |
| 2016/0360529 A1* | 12/2016 | Lee | H04L 5/0048 |
| 2017/0019904 A1* | 1/2017 | Krishnamoorthy | H04W 4/70 |
| 2017/0055232 A1* | 2/2017 | Kim | H04W 76/14 |
| 2017/0085401 A1* | 3/2017 | Qian | H04L 27/2655 |
| 2017/0093540 A1* | 3/2017 | Lei | H04L 5/0044 |
| 2017/0094680 A1* | 3/2017 | Patel | H04W 72/1284 |
| 2017/0141885 A1* | 5/2017 | Bontu | H04L 5/006 |
| 2017/0164350 A1* | 6/2017 | Sun | H04L 5/0007 |
| 2017/0180001 A1* | 6/2017 | Wang | H04B 1/7143 |
| 2017/0181182 A1* | 6/2017 | Patel | H04W 72/1231 |
| 2017/0290056 A1* | 10/2017 | Islam | H04W 74/085 |
| 2017/0303220 A1* | 10/2017 | Sadeghi | H04L 5/0053 |
| 2017/0332383 A1* | 11/2017 | Frenger | H04L 27/2666 |
| 2017/0353938 A1* | 12/2017 | Nilsson | H04W 56/0005 |
| 2018/0006791 A1* | 1/2018 | Marinier | H04L 1/0026 |
| 2018/0097679 A1* | 4/2018 | Zhang | H04L 27/2607 |
| 2018/0115359 A1* | 4/2018 | Kim | H04W 4/70 |
| 2018/0124790 A1* | 5/2018 | Yerramalli | H04W 16/14 |
| 2018/0124815 A1* | 5/2018 | Papasakellariou | H04L 5/0053 |
| 2018/0145802 A1* | 5/2018 | Hwang | H04W 72/04 |
| 2018/0241508 A1* | 8/2018 | Chervyakov | H04L 5/0051 |
| 2018/0254797 A1* | 9/2018 | Amini | H04L 5/005 |
| 2018/0263004 A1* | 9/2018 | Andersson | H04L 5/0007 |
| 2018/0270007 A1* | 9/2018 | Sandberg | H04W 72/1289 |
| 2018/0278308 A1* | 9/2018 | Jin | H04B 7/0617 |
| 2018/0323918 A1* | 11/2018 | Chuang | H04L 5/005 |
| 2018/0323931 A1* | 11/2018 | Kiyoshima | H04W 72/04 |
| 2018/0343665 A1* | 11/2018 | Yan | H04W 72/12 |
| 2019/0029026 A1* | 1/2019 | Yun | H04J 11/003 |
| 2019/0052354 A1* | 2/2019 | Roessel | H04L 27/2607 |
| 2019/0268205 A1* | 8/2019 | Shin | H04L 27/26 |

* cited by examiner

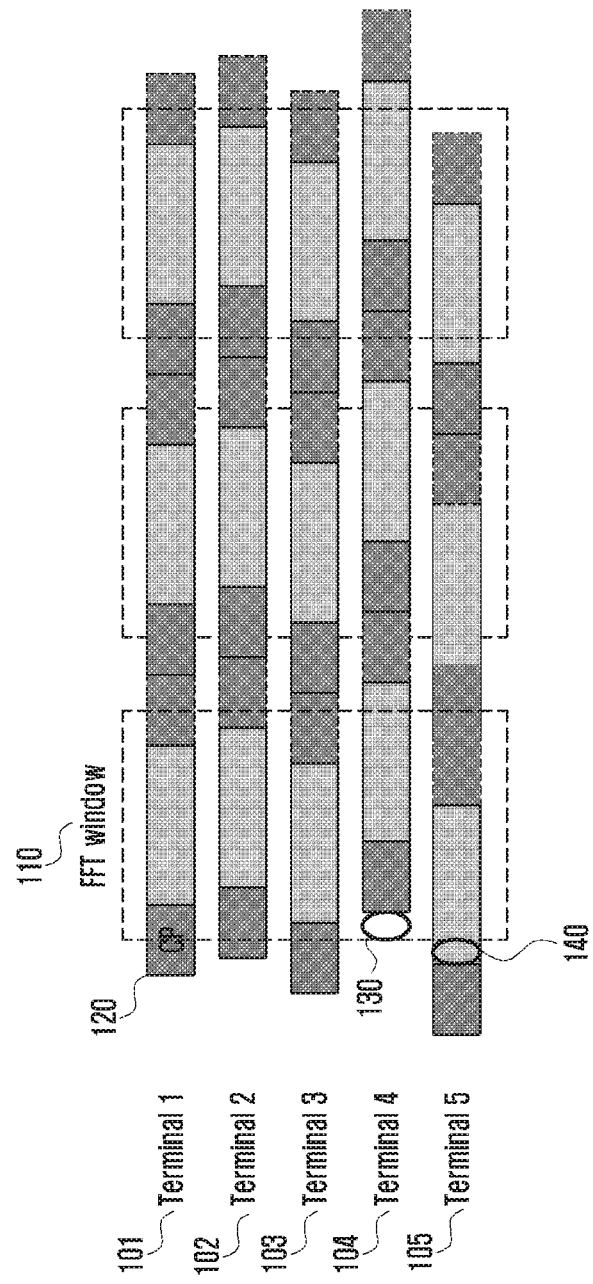

METHOD AND APPARATUS FOR EFFICIENTLY TRANSMITTING AND RECEIVING DATA IN A WIRELESS COMMUNICATION SYSTEM

CROSS-REFERENCE TO RELATED APPLICATION AND CLAIM OF PRIORITY

This application is related to and claims priority to Korean Patent Application No. 10-2016-0113188 filed on Sep. 2, 2016, the contents of which are incorporated herein by reference.

TECHNICAL FIELD

Various embodiments of the present disclosure relate to a mobile communication system, and more particularly, to a method and an apparatus for efficiently transmitting and receiving a data in a mobile communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, the 5G communication system has considered a support for various services compared to the existing 4G system. For example, the most representative services are an enhanced mobile broadband (eMBB) communication service, an ultra-reliable and low latency communication (URLLC) service, a massive machine type communication (mMTC) service, an evolved multimedia broadcast/multicast service (eMBMS), etc.

Unlike the existing 4G system, the URLLC service is a service that is newly considered in the 5G system and need to satisfy ultra high reliability (packet error rate of $10^{-5}$) and low latency (0.5 msec) conditions, compared to other services. For example, the URLLC service may be used for services such as self-driving, e-health, and drone.

However, a scheduling request procedure which is basically performed in a cellular uplink system requires a plurality of information exchange processes between a base station and a terminal and therefore is not suitable to achieve the low latency target of the URLLC. Therefore, a grant-free and contention-based transmission technique is considered for supporting a URLLC service in an uplink system.

In addition, an mMTC service considers the minimization of the power consumption of the terminal as a very important performance index. To this end, the terminal needs to minimize a control signal exchange with the base station. However, the uplink scheduling request procedure is not suitable to minimize the power consumption of the mMTC because the uplink scheduling request procedure requires a plurality of information exchange processes between the base station and the terminal. Therefore, the grant-free and contention-based transmission technique is considered as a main scenario to support the uplink mMTC.

Meanwhile, in the uplink cellular network, the terminal can be operated based on downlink synchronization acquisition information. However, since the uplink system transmits a signal to one base station at terminals located at various positions, a receiver (base station) receives signals at different timings even if the downlink synchronization is obtained. Accordingly, the cellular system can estimate an arrival time of a received signal from each terminal in advance and transmit the signal to the terminal in consideration of the corresponding time, which is referred to as timing advance (TA) value compensation. In general, the TA value can be calculated based on initial random access channel (RACH) processing and updated based on a periodic RACH re-execution procedure.

However, when supporting the uplink mMTC or URLLC, the RACH procedure may not be performed again to minimize the information exchange process between the base station and the terminal. Therefore, the TA value estimated based on the initial RACH procedure is different from the TA value of the uplink transmission time of the actual terminal, which may cause a timing offset in the receiver (base station) to significantly reduce error probability performance. Therefore, there is a need for a method capable of preventing deterioration in performance due to an occurrence of a timing offset.

SUMMARY

To address the above-discussed deficiencies, it is a primary object to provide disclosure a method and an apparatus for efficiently transmitting and receiving a data by reducing deterioration in performance even when a timing offset between received signals occurs due to a TA compensation error in the case of supporting a URLLC service or an mMTC service in an uplink system.

Objects of the present disclosure are not limited to the above-mentioned objects. That is, other objects that are not mentioned may be obviously understood by those skilled in the art to which the present disclosure pertains from the following description.

Various embodiments of the present disclosure are directed to the provision of a method of a terminal including: generating a signal; identifying a category of the terminal; mapping the generated signal to a resource using resource mapping information determined based on the category of the terminal; and transmitting the signal using the mapped resource.

Various embodiments of the present disclosure are directed to the provision of a method of a base station including: receiving a signal from a terminal; identifying a category of the terminal; and extracting the received signal mapped to a resource element according to resource mapping information determined based on the category of the terminal.

Various embodiments of the present disclosure are directed to the provision of a terminal, including: a transceiver configured to transmit and receive signals; and at least one processor configured to generate a signal, identifying a category of the terminal, mapping a resource to the generated signal using resource mapping information determined based on the category of the terminal, and transmitting the signal using the mapped resource.

Various embodiments of the present disclosure are directed to the provision of a base station, including: a transceiver configured to transmit and receive signals; and at least one processor configured to receive signals from a terminal, identifying a category of the terminal, and extracting the received signal mapped to a resource element according to resource mapping information determined based on the category of the terminal.

According to the exemplary embodiment of the present disclosure, it is possible to efficiently transmit and receive a data by reducing the deterioration in performance even if the timing offset between the received signals occurs due to the TA compensation error in the case of supporting the URLLC service or the mMTC service in the uplink system.

The effects that may be achieved by the embodiments of the present disclosure are not limited to the above-mentioned objects. That is, other effects that are not mentioned may be obviously understood by those skilled in the art to which the present disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates a situation where a plurality of terminals transmits an uplink signal in a time domain.

DETAILED DESCRIPTION

Figure 2A:
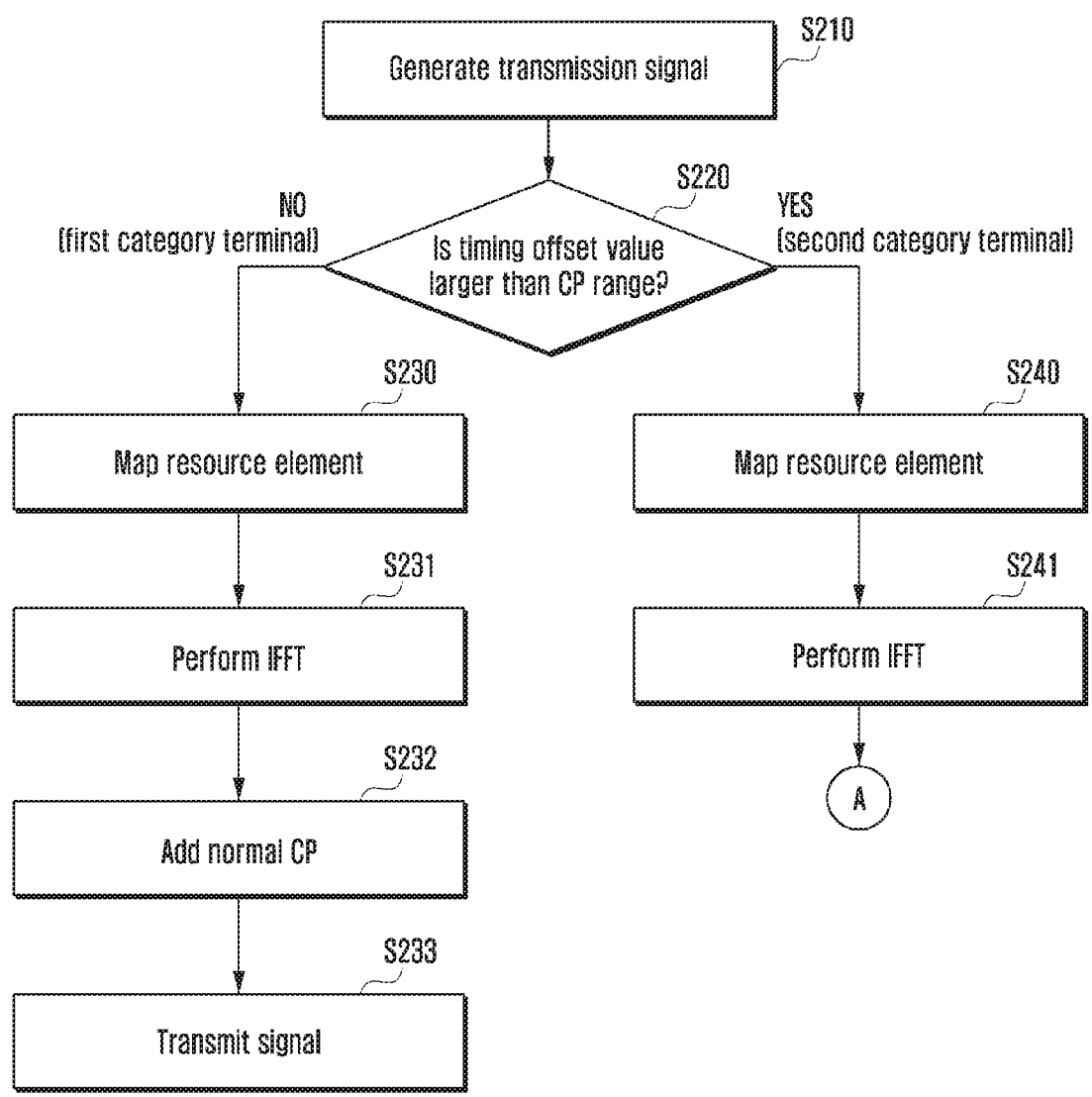
FIGS. 2A and 2B illustrate an operation of a terminal according to an embodiment of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In describing the embodiments of the present disclosure, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

In describing the embodiments of the present disclosure, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term "-unit" used in the present embodiment means software or hardware components such as FPGA and ASIC and the "~unit" performs any roles. However, the meaning of the "~unit" is not limited to software or hardware. The "~unit" may be configured to be in a storage medium that may be addressed and may also be configured to reproduce one or more processor. Accordingly, for example, the "~unit" includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the "~units" may be combined with a smaller number of components and the "~units" or may be further separated into additional components and "~units." In addition, the components and the "~units" may also be implemented to reproduce one or more CPUs within a device or a security multimedia card.

FIG. 1 illustrates a situation where a plurality of terminals transmits an uplink signal in a time domain.

Referring to FIG. 1, terminals 101 to 105 in a cell may transmit an uplink signal in a time domain. A receiver (base station) can perform fast Fourier transform (FFT) by extracting a signal transmitted by a terminal. An FFT window 110 of FIG. 1 may represent a window for extracting a received signal to allow a receiver to perform FFT.

As illustrated in FIG. 1, the signals received from the terminal 1 101, the terminal 2 102, and the terminal 3 103 can keep inter-subcarrier orthogonality even after the FFT because only a cyclic prefix (hereinafter, CP) 120 and a data signal are in the FFT window. However, the signals received from the terminal 4 104 and the terminal 5 105 influence some of signals 130 of neighboring OFDM symbols in the FFT window 110 and some 140 of their signals are lost. Therefore, the signals received from the terminal 4 104 and the terminal 5 105 do not keep the inter-subcarrier orthogonality, which causes the error rate performance deterioration of their own signals as well as influences even the received signals from other terminals as an interference signal to significantly reduce the error rate performance. The interference effect occurring due to the above causes has a form of random noise, which may be hardly overcome even by an interference suppression or cancellation receiving technology which has been actively studied recently.

The timing offset due to the TA compensation error may significantly reduce the reception performance of the base station because it is difficult to achieve target reliability performance for the URLLC service and may be a cause of increasing power consumption by performing additional retransmission or additional parity transmission for the mMTC service. Therefore, it is necessary to develop an effective transmission/reception method capable of preventing deterioration in performance due to occurrence of a timing offset when supporting the uplink mMTC or URLLC.

Figure 2B:
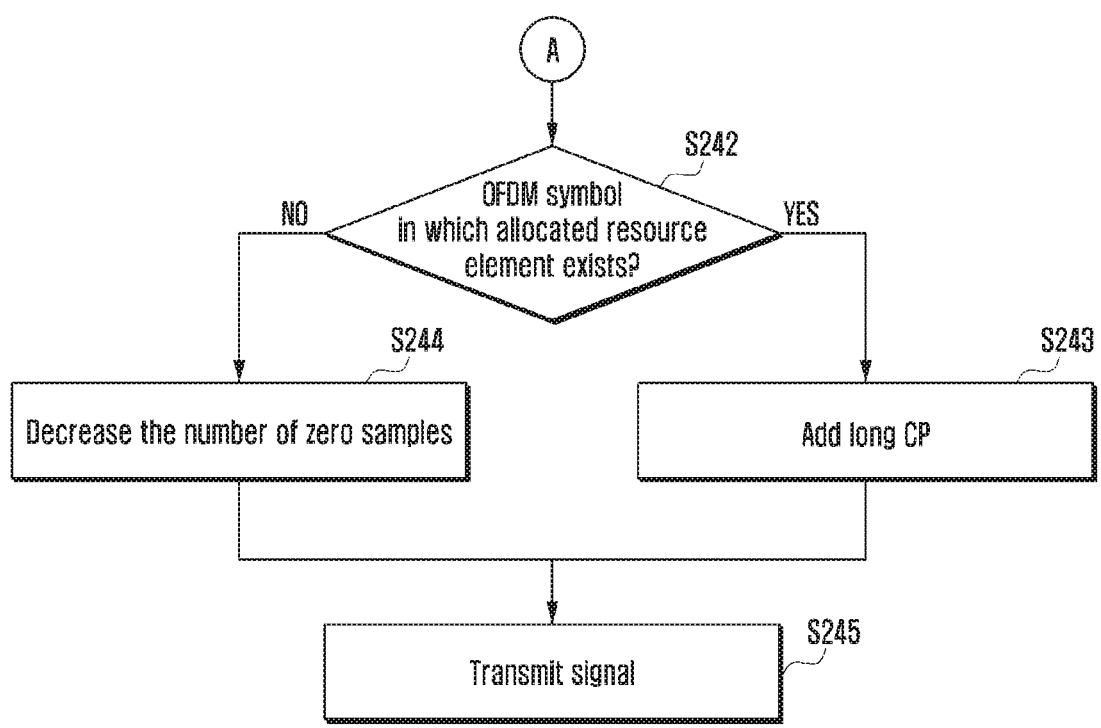

FIGS. 2A and 2B illustrate an operation of a terminal according to an embodiment of the present disclosure.

Referring to FIG. 2, the terminal may generate a transmission signal in step S210. At this time, the terminal can generate a frequency domain transmission signal.

The terminal generating the transmission signal can identify a category of the terminal in step S220. The terminal can determine whether a timing offset value that the terminal can generate may be larger than a CP range, thereby determining the category of the terminal. According to the embodiment of the present disclosure, a terminal having a timing offset value equal to or less than the CP range may be classified as a first category terminal, and a terminal having a timing offset value equal to or larger than the CP range may be classified as a second category terminal.

In this case, in the case of the second category terminal having the timing offset value larger than the CP range, signals of other OFDM symbols may be influenced in the FFT window as in the terminal 4 or the terminal 5 of FIG. 1, such that the resource mapping method of the terminal can be applied differently.

The present disclosure proposes a method for efficiently transmitting and receiving a data by reducing deterioration in performance for a second category terminal. At this time, the detailed content of determining the category of the terminal by determining whether the timing offset value is larger than the CP range or not will be described later.

If it is determined that the terminal is the first category terminal, the terminal can map resource elements (REs) in step S230. The terminal can map a signal to a resource element of a resource block allocated to the terminal according to the resource mapping information, and can map resource elements in a frequency domain.

More specifically, the base station may allocate at least one resource block as a transmission region for a plurality of terminals. When a signal to be transmitted is generated, the terminal may map a signal to a resource element according to a resource mapping pattern of the terminal in the corresponding region.

In this case, the resource mapping information may be referred to as first resource mapping information as the resource mapping information on the first category terminal, and may include information related to patterns of resource elements to be mapped to the first category terminal in the resource block. In addition, the resource mapping information may include a resource element group mapping pattern consisting of a resource mapping pattern specific to the first category terminal (Cat. 1 UE specific RE mapping pattern) or a plurality of resource elements.

In step S231, the terminal mapping the resource elements can convert the signal into a signal in the time domain by performing inverse fast Fourier transform (IFFT) in step S231 and then add a normal CP (hereinafter, referred to as a first CP or a general CP) applied to a signal in a time domain in step S232.

The terminal performing the above process can transmit the signal generated in step S233 to the base station.

On the other hand, if it is determined that the terminal is the second category terminal, the terminal can map resource elements in step S240. The terminal can map a signal to a resource element of a resource block allocated to the terminal according to the resource mapping information. In detail, the terminal can map a resource element in a frequency domain to a signal. In this case, the resource mapping information may be referred to as second resource mapping information as the resource mapping information on the second category terminal, and may include information related to patterns of resource elements to be mapped to the second category terminal in the resource block. In addition, the resource mapping information may include a resource element group mapping pattern consisting of a resource mapping pattern specific to the second category terminal (Cat. 2 UE specific RE mapping pattern) or a plurality of resource elements.

In this case, a method of not mapping resource elements to a symbol adjacent to a symbol mapped to a resource element so as not to be influenced by signals of neighboring OFDM symbols may be used for the second category terminal. That is, the second category terminal is divided into two groups, the resources are mapped to use odd-numbered OFDM symbols for terminals included in a first group among symbols of resource blocks, and resources may be mapped to use even-numbered OFDM symbols for terminals included in a second group. The detailed content thereof will be described below.

The terminal mapping the resource elements can perform inverse fast Fourier transform (IFFT) in step S241 to convert a signal into a signal in a time domain.

In step S242, the terminal performing the IFFT can identify whether the corresponding OFDM symbol is an OFDM symbol in which the resource element allocated thereto exists.

In the case of the OFDM symbol in which the resource elements to which the corresponding OFDM symbol is allocated exist, the terminal may add a long CP (hereinafter, referred to as a second CP) to the signal in the time domain in step S243. At this time, a length of the long CP is set to exceed the CP range, and the timing offset value may be set to be equal to or less than the long CP range.

In the present disclosure, the normal CP may mean a CP determined in consideration of a maximum delay of a multipath channel and an influence of a shaping filter applied in the system. On the other hand, the long CP may further mean the CP determined in additional consideration of the timing offset. A detailed method for adding a CP will be described later.

If the OFDM symbol is an OFDM symbol in which there is no resource element to which the OFDM symbol is allocated, the terminal can generate a zero signal in the corresponding OFDM symbol.

In addition, in step S244, the terminal may reduce the number of zero samples in consideration of the length of the long CP. This is for aligning boundaries of OFDM symbols, and the detailed content thereof will be described later.

Thereafter, the terminal may transmit a signal to the base station in step S245.

It is possible to prevent the deterioration in performance of the second category terminals whose timing offset value exceeds the CP range by the above process and significantly reduce the influence of interference on the first category terminal.

Figure 3:
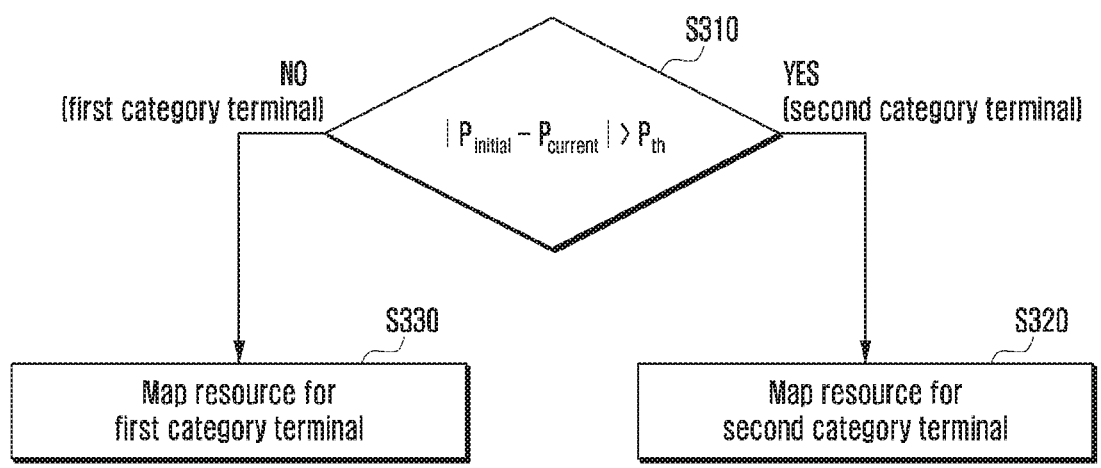
FIG. 3 illustrates a method of determining a category of a terminal.

FIG. 3 illustrates a method of determining a category of a terminal.

Referring to FIG. 3, the terminal can determine whether the timing offset value is larger than the CP range using the received signal, and determine the category of the terminal.

In step S310, the terminal compares a power estimation value ($P_{initial}$) of a downlink received signal at the time when a first RACH is performed (or at an initial connection time) with a power estimation value ($P_{current}$) of a current downlink received signal to be able to determine whether the timing offset value is larger than the CP range and determine the category of the terminal.

Therefore, if a difference between the power estimation value of the downlink received signal at the time of performing the first RACH and the power estimation value of the current downlink received signal is larger than a threshold value, the terminal can be determine to be the second category terminal having the timing offset value larger than the CP range. At this time, the threshold value may be preset or may be set by the base station.

The timing offset and the power value of the downlink received signal estimated by the terminal can be determined according to a distance between the terminal and the base station. That is, as the distance between the terminal and the base station increases, the value of the timing offset may increase, and the power value of the downlink received signal may decrease.

Therefore, as the difference between the time when the RACH is performed and the power value of the current downlink received signal increases, the difference of the timing offset may become larger, which may mean that the TA compensation error may occur in case of using the TA value acquired at the time when the RACH is performed.

Therefore, if the difference between the power estimation value of the downlink received signal at the time when the first RACH is performed and the power estimation value of the current downlink received signal exceeds the threshold value, the technology of the present disclosure may classify the terminal into the second category terminal to prevent the deterioration in performance. Therefore, the terminal may apply the resource mapping for the second category in step S320. That is, the terminal can map the signal to the allocated resource using the second resource mapping information on the second category terminal.

On the other hand, if the difference between the power estimation value of the downlink received signal at the time when the first RACH is performed and the power estimation value of the current downlink received signal does not exceed the threshold value, the terminal may apply the resource mapping to the first category terminal in step S330. The terminal can map the signal to the allocated resource using the first resource mapping information on the first category terminal.

Figure 4:
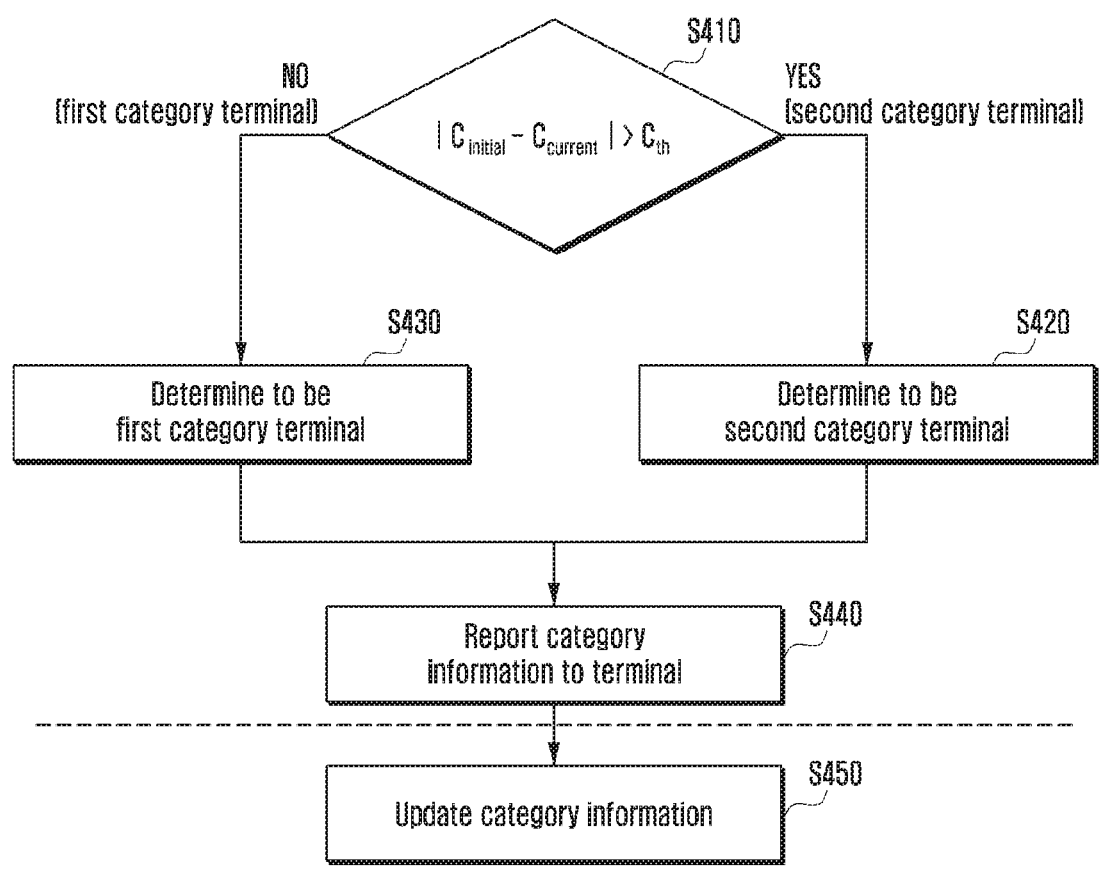
FIG. 4 illustrates another method of determining a category of a terminal.

FIG. 4 illustrates another method of determining a category of a terminal.

A method of determining a category of a terminal using a channel quality indicator (CQI) will be described with reference to FIG. 4. Specifically, in the present method, the base station can determine the category of the terminal using the CQI received from the terminal and periodically inform the terminal of the corresponding information, such that the terminal can identify the terminal's own category information.

Specifically, the base station may transmit a reference signal for measuring a channel state to the terminal, and may receive channel state information from the terminal. At this time, the channel state information may be periodically or aperiodically transmitted to the base station The base station can estimate a position change using CQI information or reference signal received power (RSRP) information which the terminal periodically or aperiodically feedbacks. As the distance between the base station and the terminal increases, the channel quality or power may decrease. Therefore, the base station can estimate the position of the terminal using the CQI or RSRP information fed back from the terminal.

Therefore, in step S410, the base station compares CQI information ($C_{initial}$) fed back by the terminal at the time of an initial connection with the latest CQI information ($C_{current}$) that is fed back by the terminal in order to determine whether the timing offset value is larger than the CP range and determine the category of the terminal.

If the difference between the CQI information fed back at the time of the initial connection and the latest fed back CQI information is larger than the threshold value, in step S420, the base station can determine the terminal as the second category terminal whose timing offset is equal to or larger than the CP range.

On the other hand, if the difference between the CQI information fed back at the time of the initial connection and the latest fed back CQI information is smaller than the threshold value, in step 430, the base station can determine the terminal as the first category terminal whose timing offset is equal to or larger than the CP range. At this time, the threshold value may be preset or may be set by the base station.

Accordingly, the base station may report the category information of the terminal determined in step S440 to the terminal through a radio resource control (RRC) message.

Accordingly, in step S450, the terminal can receive the message to update the terminal's own category information.

Figure 5:
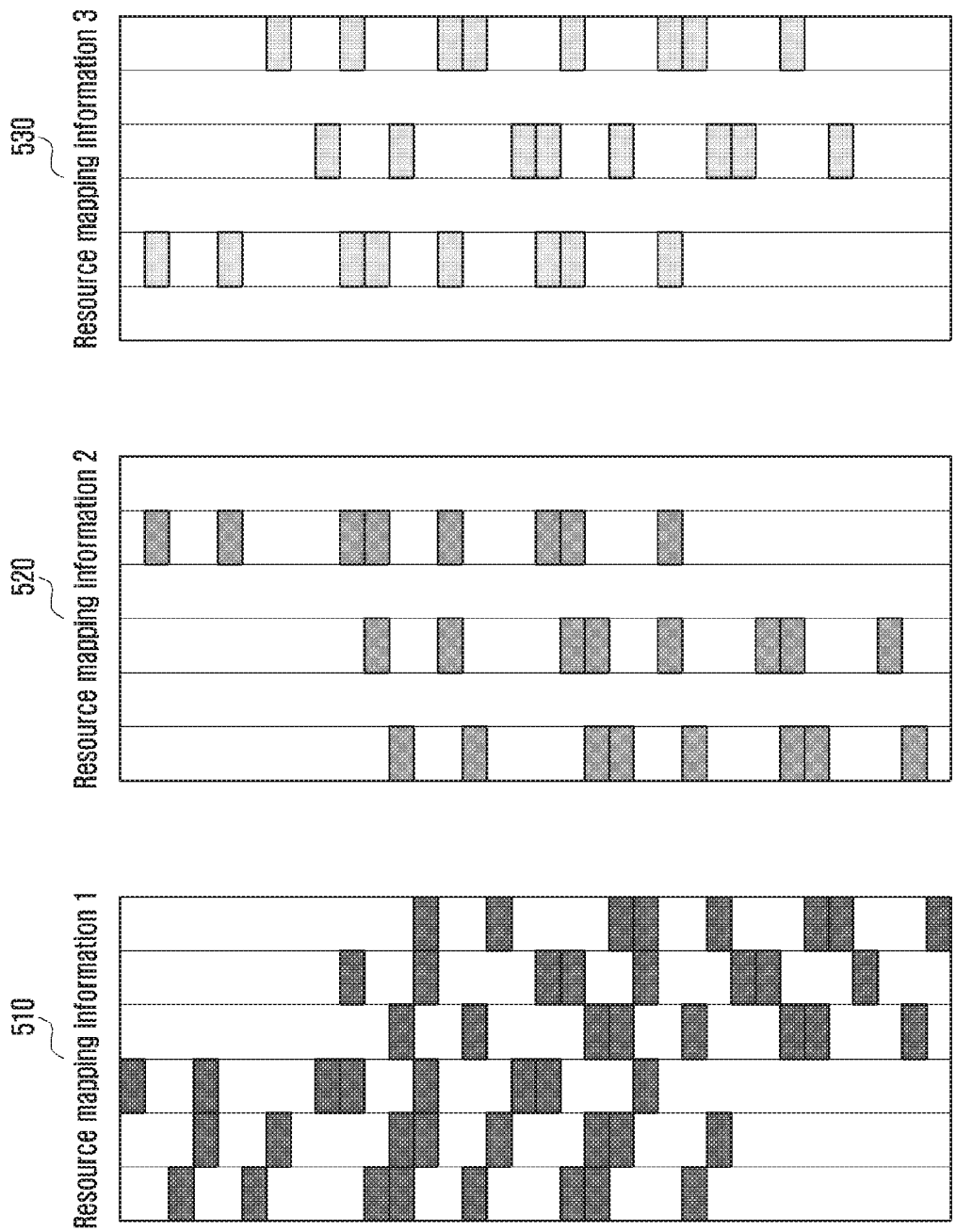
FIG. 5 illustrates a resource mapping method according to an embodiment of the present disclosure.

FIG. 5 illustrates a resource mapping method according to an embodiment of the present disclosure.

Referring to FIG. 5, resource mapping information 1 510 indicates first resource mapping information on a first category terminal, and resource mapping patterns 2 and 3 520 and 530 indicate second resource mapping information on a second category terminal.

The first category terminal may map resource elements to all OFDM symbols. The first category terminal can use resource the mapping information 1 510 in which resource elements are mapped to all OFDM symbols and can randomly transmit data in resources allocated through the resource mapping information 510. At this time, the first category terminal can use some or all of the resource elements included in the resource mapping information 510, and the resource mapping information 510 is not limited thereto. That is, the resource mapping information may consist of different types of patterns.

When the resource elements are mapped to all OFDM symbols as described above, a collision between resources may occur, which may be solved by a receiver technology (for example, non-orthogonal multiple access (NOMA) reception technology, MMSE-IRC, symbol-level interference cancellation, codeword-level interference cancellation, etc.).

On the other hand, the second category terminal may not allocate resource elements to neighboring OFDM symbols. As described above, the second category terminal can be classified into the first group and the second group, and resources can be allocated to the terminals included in the first group to use the odd-numbered OFDM symbols and resources can be allocated to the terminals included in the second group to use even-numbered OFDM symbols.

Specifically, the terminals included in the first group of the second category may use the resource mapping information 2 520 in which resource elements are mapped to the odd-numbered OFDM symbols. At this time, the terminals included in the first group of the second category can transmit all data, which are to be transmitted in the even-numbered OFDM symbols, in the odd-numbered OFDM symbols included in the resource mapping pattern 2 520. By the method, a data rate is not reduced, and data can be transmitted with minimal interference.

Similarly, the terminals included in the second group of the second category may use the resource mapping information 3 530 in which resource elements are mapped to the even-numbered OFDM symbols. At this time, the terminals included in the second group of the second category can transmit all data, which are to be transmitted in the odd-numbered OFDM symbols, in the even-numbered OFDM symbols included in the resource mapping pattern 3 530. By the method, a data rate is not reduced, and data can be transmitted with minimal interference. On the other hand, the following two methods of generating resource mapping information can be considered.

In some embodiments, a rule for generating unique resource mapping information on each terminal and a method of not using a part of a region are considered according to the category of the terminal.

According to the first method, one pattern in which resource elements are mapped in all OFDM symbols such as the resource mapping information 1 510 according to a predetermined rule can be generated for each terminal, and the terminal can generate odd-numbered OFDM symbols and even-numbered OFDM symbols according to the category. For example, if the terminal is determined to be the first category terminal, the terminal may generate the resource mapping information 1 510 and transmit data using all the resource elements included in the resource mapping information 1 510. On the other hand, if the terminal is determined to be the second category terminal, the terminal can generate the resource mapping information 1 510 and transmit data using only the resource elements mapped to the odd-numbered OFDM symbols or the even-numbered OFDM symbols included in the resource mapping pattern 1 510.

If such a method is used, rules for determining resource mapping information corresponding to the number of terminals may be required, and a rule for determining resource mapping information on each terminal may be defined. For example, a method of determining resource mapping information using a UE unique identifier to a terminal can be defined. Alternatively, a method of determining resource mapping information using both a UE unique identifier and a cell unique identifier may be defined. If the resource mapping information is determined to map resources in this manner, interference signals received from other cells can be seen at random. Accordingly, the terminal may determine the resource mapping information according to the corresponding rule, and can transmit and receive data using some or all of the resource elements according to the category.

Alternatively, the base station may generate resource mapping information on each terminal and transmit the generated resource mapping information to the terminal.

In some embodiments, a rule for generating resource mapping information on each terminal by each category type is defined. In some embodiments, if the category of the terminal is determined, a method for determining resource mapping information using the corresponding rule is considered.

According to the second method, if the terminal is determined as the first category, the terminal can generate the resource mapping information such as the resource mapping pattern 1 510 according to the corresponding rule and apply the resource mapping information to transmit and receive data. On the other hand, if the terminal is determined as the second category, the terminal can generate the resource mapping information such as the resource mapping information 2 520 and the resource mapping information 3 530 according to the corresponding rule and apply the generated resource mapping information to transmit and receive data.

In this case, if the terminal is the second category, it may be predefined as the first group or the second group. In this case, the terminal can be set to generate only one of the resource mapping information 520 and the resource mapping information 330. That is, the generation rule for either the resource mapping information 2 520 or the resource mapping information 3 530 may be established in the terminal.

Alternatively, the terminal may be configured to generate the resource mapping information 2 520 or generate the resource mapping information 3 530 according to the situation. In this case, all the generation rules for the resource mapping information 2 520 and the resource mapping information 3 530 may be established in the terminal.

If the method is used, a rule for generating resource mapping information twice or more than the first method may be required, and a rule for generating resource mapping information on each terminal may be defined. Therefore, the resource mapping information can be determined based on the rule determined according to the category, and data can be transmitted and received based on the resource mapping information.

Alternatively, the base station may generate resource mapping information on each terminal and transmit the generated resource mapping information to the terminal.

On the other hand, if the terminal is determined to be the second category, the terminal can generate the OFDM symbol adjacent to an OFDM symbol to which the resource element is mapped as a zero signal, and the specific content thereof will be described with reference to FIG. 6.

Figure 6:
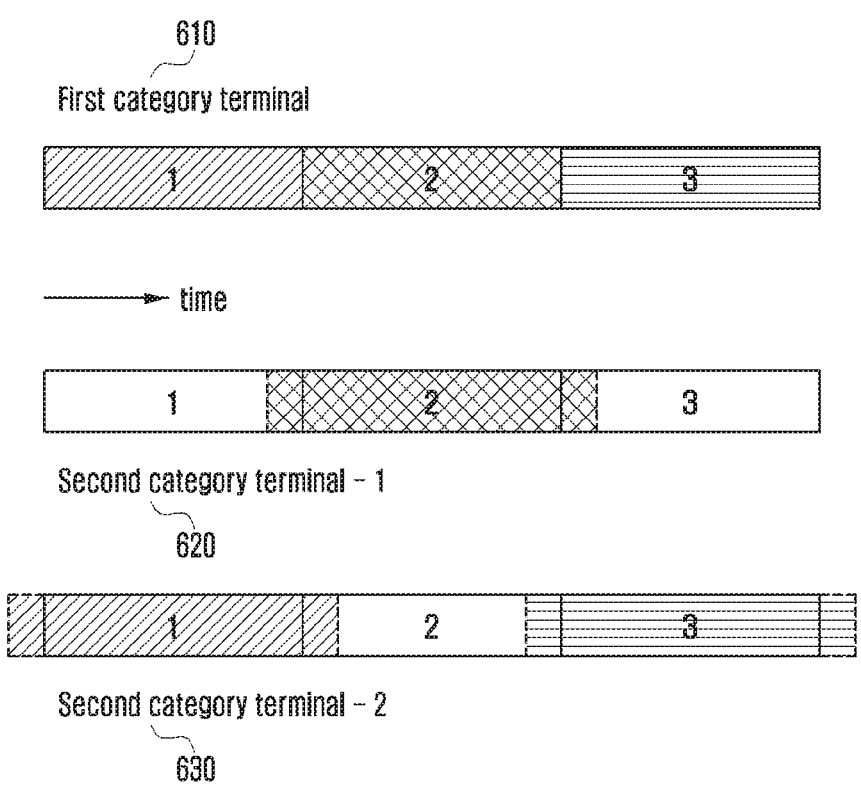
FIG. 6 illustrates a resource mapping method according to an embodiment of the present disclosure.

FIG. 6 illustrates a resource mapping method according to an embodiment of the present disclosure.

Referring to FIG. 6, a first category terminal 610 may transmit data for all OFDM symbols. On the other hand, a second category terminal-1 620 can transmit data only in OFDM symbol 2, and generate and transmit a zero signal in the OFDM symbols 1 and 3. That is, the second category terminal-1 620 may not transmit data in the OFDM symbols 1 and 3.

In addition, the second category terminal 620 and a second category terminal-2 630 which is a terminal included in another group may transmit data in the OFDM symbols 1 and 3 and may not transmit data in the OFDM symbol 2.

Figure 7A:
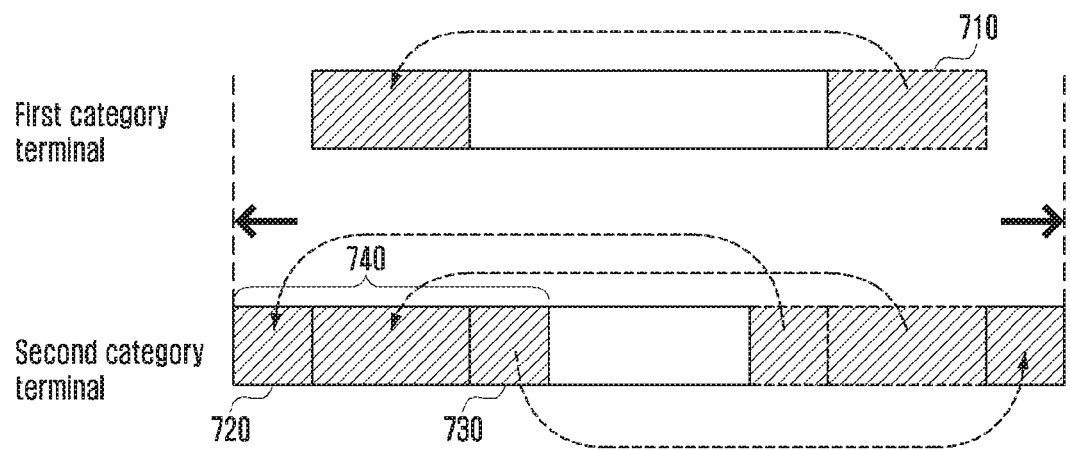
FIGS. 7A and 7B illustrate a CP adding method according to an embodiment of the present disclosure.
Figure 7B:
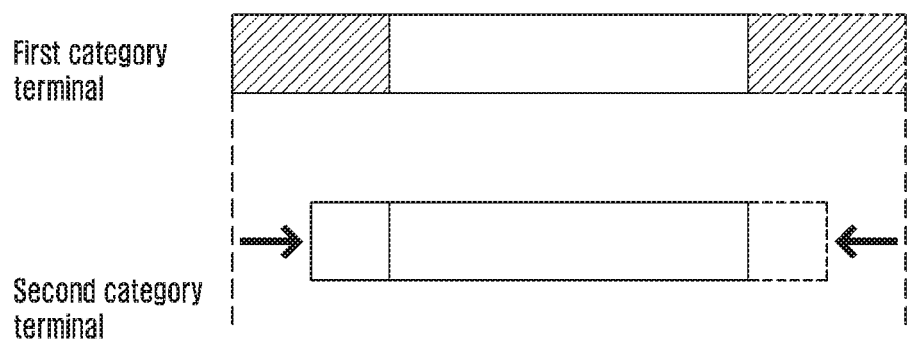

FIGS. 7A and 7B illustrate a CP adding method according to an embodiment of the present disclosure.

As described above, the terminal mapping the resource elements can perform the IFFT and identify whether the corresponding OFDM symbol is the OFDM symbol in which the allocated resource element exists.

If the corresponding OFDM symbol is the ODFM symbol in which the allocated resource element exists, the terminal can add the long CP to the signal in the time domain. At this time, the length of the CP can be determined to be long enough to allow the timing offset value to fall within the range of the long CP. The length of the CP can be determined in various ways according to the setting.

For example, the length of the long CP can be determined to be a preset multiple of the length of the normal CP. That is, the length of the long CP can be determined to be two times, three times or the like the length of the general CP.

Alternatively, the length of the long CP can be determined based on the method shown in FIG. 7A

The first category terminal may be configured in such a manner that a normal CP 710 is added before and after data. Meanwhile, the second category terminal can extend the CP length by attaching additional CPs 720 and 730 before and after a normal CP 710 added to the data.

Referring to FIG. 7, the first category terminal may add the normal CP 710 before and after data, and the length of the CP is equal to the length of the normal CP 710.

On the other hand, the second category terminal can add the CP 720 before the normal CP, and add the CP 730 after the normal CP 730. In this way, the length of the CP can extend from the length of the normal CP 710 to a length of a long CP 740.

Meanwhile, if the corresponding OFDM symbol is an OFDM symbol in which there is no resource element to which the corresponding OFDM symbol is allocated, the terminal can generate the zero signal in the corresponding OFDM symbol. However, the terminal can remove the number of zero samples considering the length of the long CP. Referring to FIG. 7B, the terminal can remove the number of zero samples of the neighboring OFDM symbols by the length of the extended CP to align the boundary with the neighboring OFDM symbols. That is, the CP 720 portion and the CP 730 portion of FIG. 7A use the region of the neighboring OFDM symbols, and the terminal can remove zero samples from the CP 720 portion and the CP 730 portion in the neighboring OFDM symbols.

By the method as described above, the terminal may transmit data. Therefore, according to the present disclosure, the deterioration in performance of the terminal of the second category can be prevented, and the influence of interference on the first category terminal can be greatly reduced.

Figure 8:
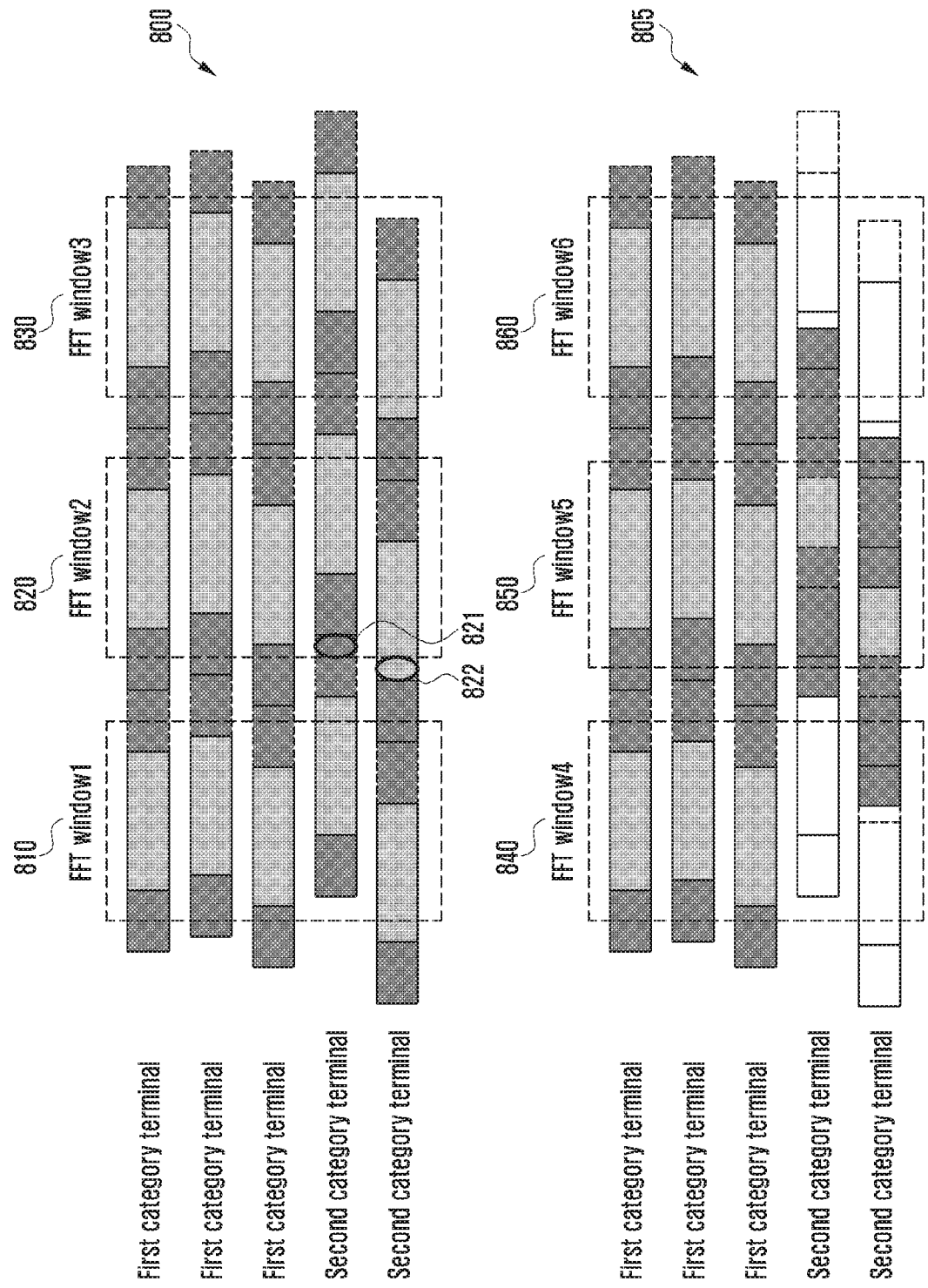
FIG. 8 illustrates a situation where a plurality of terminals transmits an uplink signal in a time domain according to an embodiment of the present disclosure.

FIG. 8 illustrates a situation where a plurality of terminals transmits an uplink signal in a time domain according to an embodiment of the present disclosure.

Referring to FIG. 8, a terminal in a cell can transmit an uplink signal in a time domain. The receiver (base station) can perform FFT by extracting a signal transmitted by the terminal. An FFT window 810 of FIG. 8 may represent a window for extracting a received signal to allow a receiver to perform FFT.

As shown in FIG. 8, the signals received from the first category terminal of drawing 800 have only CP and data signals in the FFT window, such that the inter-subcarrier orthogonality can be maintained. However, the signals received from the second category terminal are influenced by some of signals of the neighboring OFDM symbols within the FFT window and some of the signals are lost. For example, in an FFT window 2 820, reference numeral 821 is a case where the signals of neighboring OFDM symbols gives influence, and reference numeral 822 is a case where some of their signals are lost.

Meanwhile, the second category terminal can add the long CP within an FFT window 5 850 of drawing 805 of FIG. 8. Therefore, the signals received from the second category terminal also have only the CP and data signals existing in the FFT window, such that the inter-subcarrier orthogonality can be maintained even after the FFT.

Figure 9:
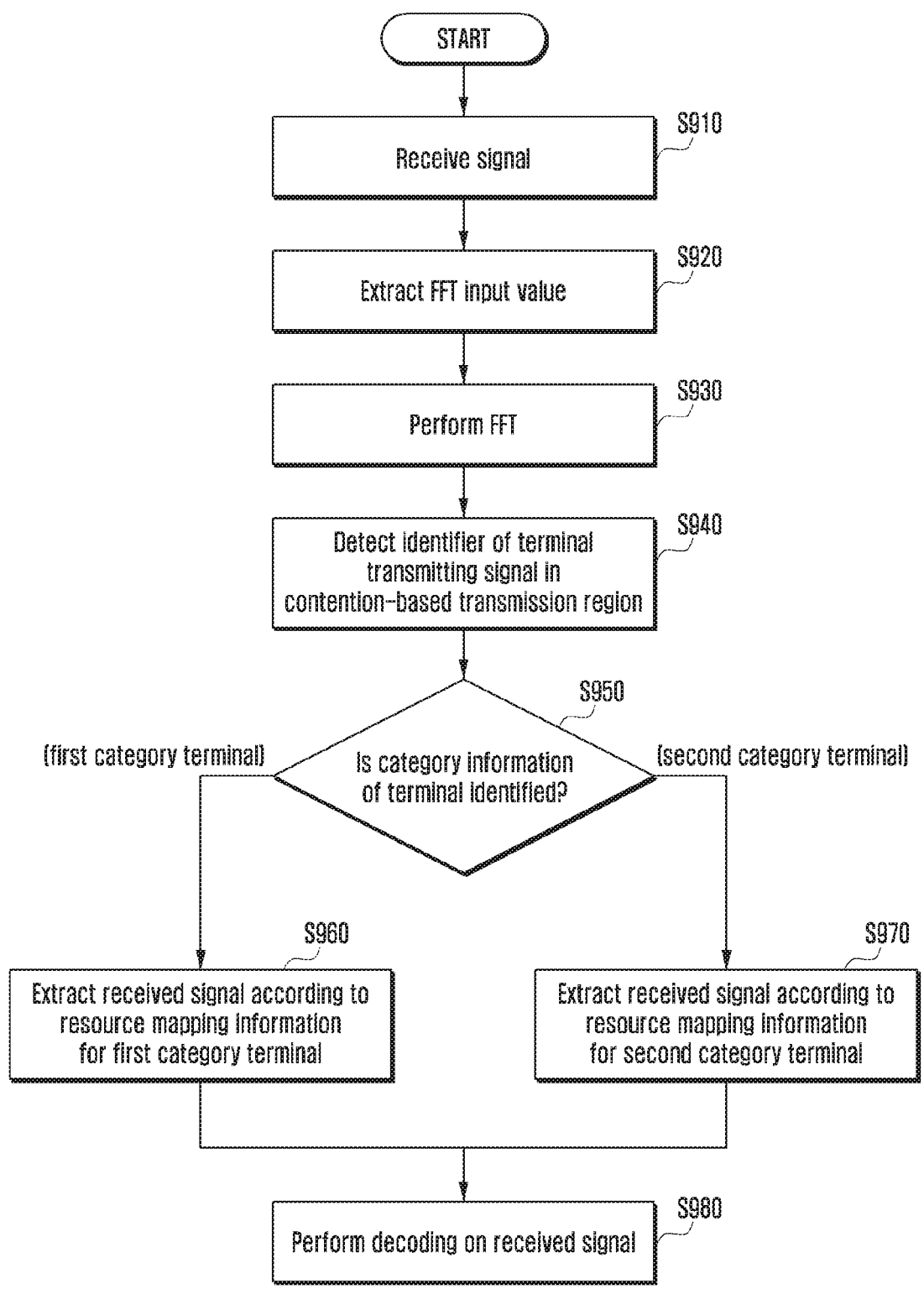
FIG. 9 illustrates a flow chart for an operation of a base station according to an embodiment of the present embodiment.

FIG. 9 illustrates a flow chart for an operation of a base station according to an embodiment of the present embodiment.

Referring to FIG. 9, the base station may receive a signal from the terminal in step S910.

The base station receiving the signal can extract an FFT input value in step S920. The base station can extract the FFT input value by applying a general CP size.

The base station extracting the FFT input value may perform the FFT in step S930.

In step S940, the base station can detect an identifier of a terminal that transmits a signal in a contention-based transmission region. The base station can detect an identifier of a terminal using a signal received on a common control channel or a data channel.

Thereafter, the base station can identify the category information of the terminal in step S950. The base station can identify the category information of the terminal by blind detection. Specifically, a correlation of a demodulation reference signal (DMRS) is performed on each even-numbered OFDM symbol or odd-numbered OFDM symbol using the resource mapping pattern for the terminal, and if the difference value is equal to or larger than a predetermined value, the terminal can be identified as the second category.

Alternatively, as described above, if the method for determining, by the base station, the category of the terminal using the CQI or RSRP received from the terminal and reporting the determined category of the terminal to the terminal, the base station may know the category of the terminal.

If the terminal is the first category terminal, the base station can extract the received signal according to the resource mapping information on the terminal in step S960. At this time, the rule for generating the resource mapping information on each terminal may be the information promised between transceivers. Accordingly, the base station can determine the resource mapping information on the terminal and extract the signal transmitted in the pattern. In case of the first category terminal, the base station can extract the received signal according to the resource mapping information in which resources are allocated to all OFDM symbols.

On the other hand, if the terminal is the second category terminal, the base station can extract the received signal according to the resource mapping information on the terminal in step S970. At this time, the base station can extract the received signal in consideration of the fact that resources are not allocated to odd-numbered or even-numbered OFDM symbols for the second category terminal.

Thereafter, the base station can perform the decoding on the received signal in step S980.

Figure 10:
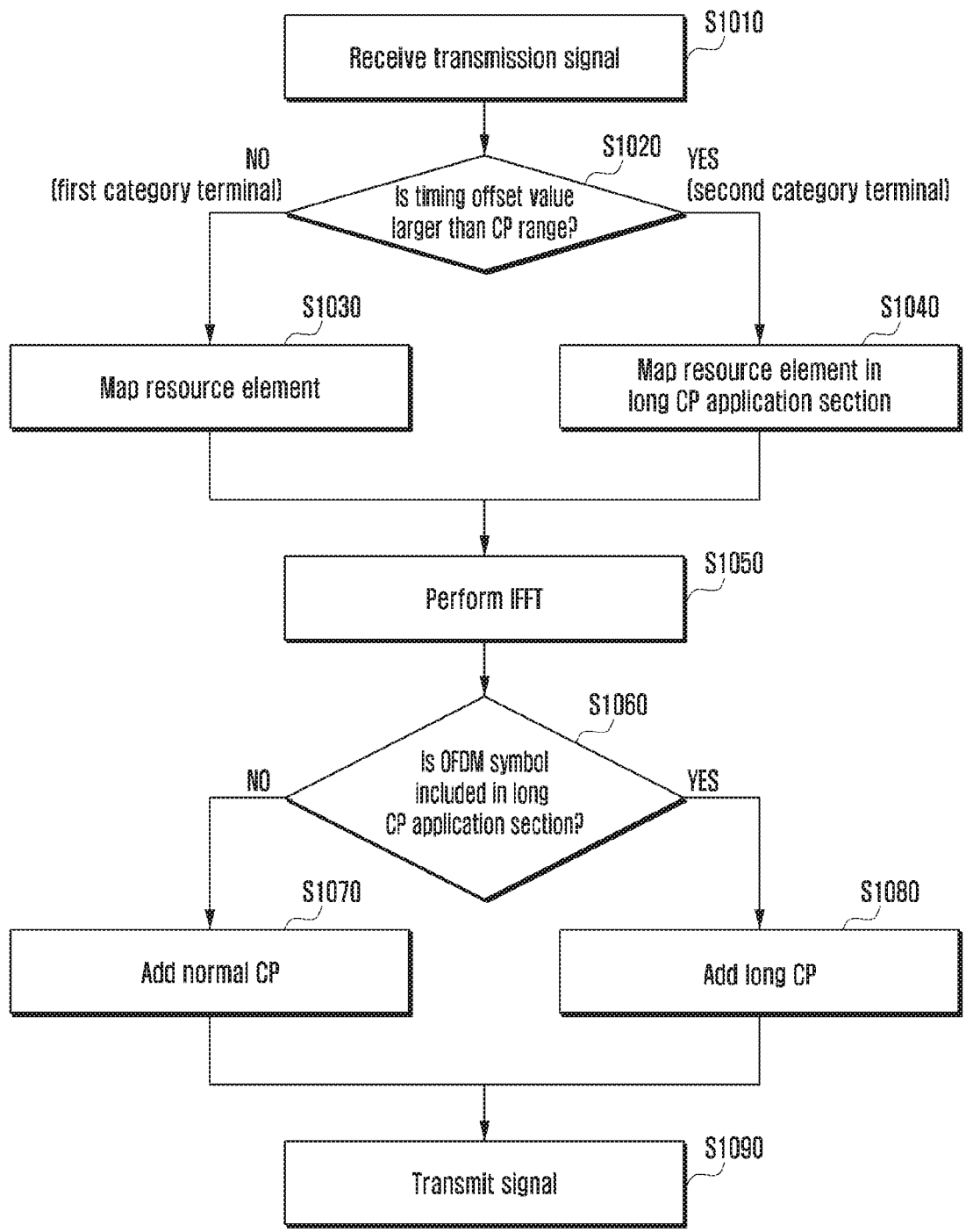
FIG. 10 illustrates a flow chart for an operation of a terminal according to another embodiment of the present embodiment.

FIG. 10 illustrates a flow chart for an operation of a terminal according to another embodiment of the present embodiment.

Referring to FIG. 10, the terminal may generate a transmission signal in step S1010. At this time, the terminal can generate a frequency domain transmission signal.

The terminal generating the transmission signal can identify the category of the terminal in step S220. The terminal can determine whether the timing offset value that the terminal can generate may be larger than a CP range, thereby determining the category of the terminal. If the timing offset is larger than the CP range, the signals of other OFDM symbols may exert an influence within the FFT window. Therefore, the resource mapping method for the terminal may be differently applied depending on whether the timing offset value is larger than the CP range. The detailed content is the same as those described above and therefore will be omitted below.

If it is determined that the terminal is the first category terminal, the terminal can map resource elements in step S1030. The terminal can map a signal to a resource element of a resource block allocated to the terminal according to the resource mapping information. In detail, the terminal can map a resource element in a frequency domain to a signal. In this case, the resource mapping information may be referred to as first resource mapping information as the resource mapping information on the first category terminal, and may include information related to patterns of resource elements to be mapped to the first category terminal in the resource block. In addition, the resource mapping information may include a resource element group mapping pattern consisting of a resource mapping pattern specific to the first category terminal (Cat. 1 UE specific RE mapping pattern) or a plurality of resource elements.

On the other hand, if it is determined that the terminal is the second category terminal, the terminal can map resource elements in step S1040. The terminal can map a signal to a resource element of a resource block allocated to the terminal according to the resource mapping information. In detail, the terminal can map a resource element in a frequency domain to a signal. In this case, the resource mapping information may be referred to as first resource mapping information as the resource mapping information on the first category terminal, and may include information related to patterns of resource elements to be mapped to the first category terminal in the resource block. In addition, the resource mapping information may include a resource element group mapping pattern consisting of a resource mapping pattern specific to the second category terminal (Cat. 2 UE specific RE mapping pattern) or a plurality of resource elements.

At this time, for the second category terminal, a method of mapping resource elements only in a specific OFDM symbol section can be used. That is, some of the OFDM symbols may be designated as symbols to be used by the second category terminal, and the resource mapping information on the second category terminal may include information on resource elements allocated in a predetermined OFDM symbol section. Accordingly, the terminal can map the resource elements according to the resource mapping information on a specific OFDM symbol section. In the present disclosure, the specific OFDM symbol section can be preset. Accordingly, in the present disclosure, an OFDM symbol section in which the resource element is mapped to the second category terminal may be referred to as a predetermined section, a long CP application section, or a second CP application section. The detailed content thereof will be described below.

The terminal mapping the resource elements can perform inverse fast Fourier transform (IFFT) in step S1050 to convert a signal into a signal in a time domain.

In step S1060, the terminal can identify whether the corresponding OFDM symbol is included in the long CP application section.

If the corresponding OFDM symbol is not included in the long CP application section, the first category terminal can add the normal CP to the signal in the time domain in step S1070. On the other hand, the second category terminal may not transmit data in the corresponding symbol.

If the OFDM symbol is included in the long CP application section, the terminal may add the long CP to the signal in the time domain in step S1080. At this time, it is possible to add the long CP to the signals of both the first category terminal and the second category terminal.

The terminal performing the above process can transmit the signal generated in step S1090 to the base station.

Figure 11:
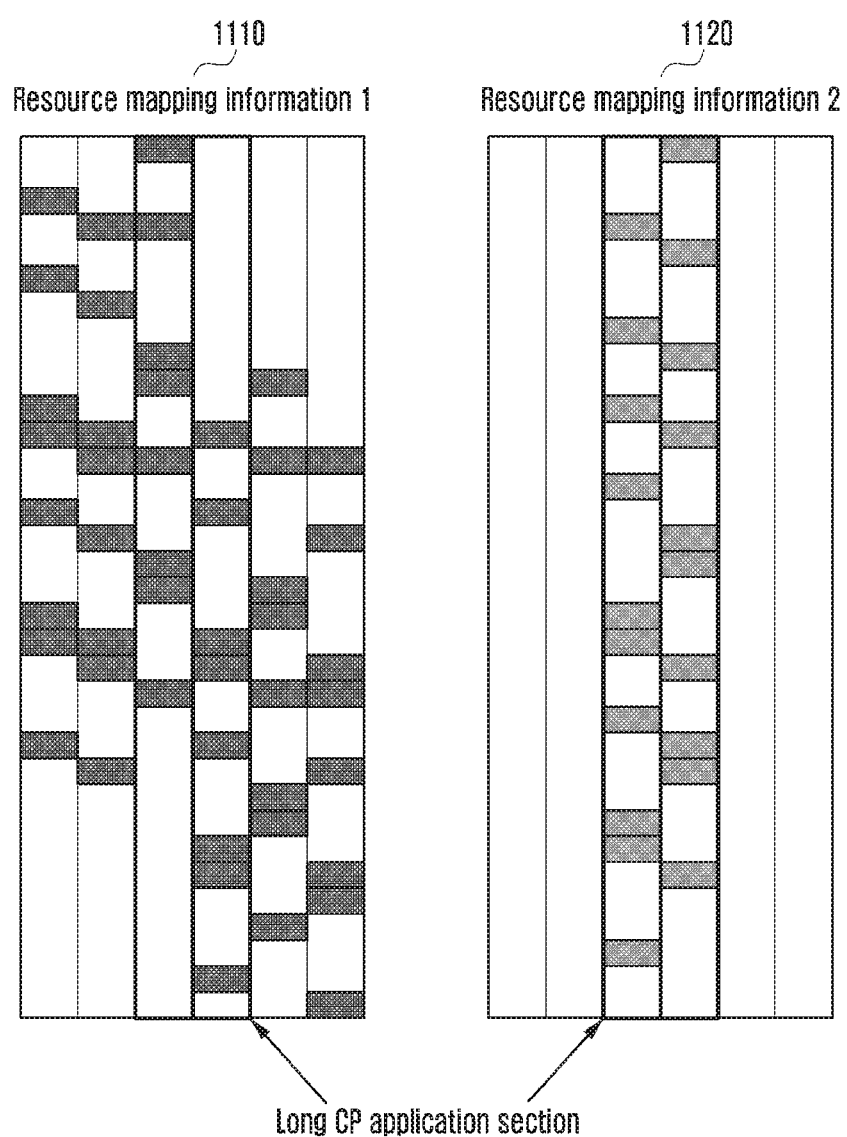
FIG. 11 illustrates a resource mapping method according to another embodiment of the present disclosure.

FIG. 11 illustrates a resource mapping method according to another embodiment of the present disclosure.

Referring to FIG. 11, that resource mapping information 1 1110 indicates first resource mapping information on a first category terminal, and resource mapping information 2 indicates second resource mapping information on a second category terminal.

The first category terminal may map resource elements to all OFDM symbols. The first category terminal can use resource the mapping information 1 510 in which resource elements are mapped to all OFDM symbols and can randomly transmit data in resources allocated through the resource mapping information 1110. At this time, the first category terminal can use some or all of the resource elements included in the resource mapping information 1110, and the resource mapping information 1110 is not limited thereto. That is, the resource mapping information may consist of different types of patterns.

In the present embodiment, a long CP may be applied in a predetermined section (a long CP application section) even in the first category terminal. Such a method can increase reliability of data transmission.

The second category terminal can use only ODFM symbols of a predetermined section (a long CP application section) within a subframe. Therefore, the resource mapping information on the second category terminal can be set in a predetermined section.

At this time, the long CP application section may be adaptively changed according to the category ratio of the terminal. For example, if the ratio of the second category terminal increases, the number of OFDM symbols may increase in the long CP application section. On the other hand, if the ratio of the second category terminal increases, the number of OFDM symbols may decrease in the long CP application section.

The base station can adaptively change the number of OFDM symbols in the long CP application section by identifying the ratios of the terminals for each category and notify the terminal of the identified ratios. If the base station notifies the terminal of the information on the long CP application section, the base station may periodically report the information on the long CP application section to the terminal. The base station can report the information on the long CP application section to the terminal through the RRC message, and the terminal can transmit data by applying a transmission scheme matching the terminal's own category.

For example, the base station may transmit the long CP application section to the terminal through the following information: (1) 00: No predetermined section; (2) 01: First OFDM symbol section; (3) 10: First to second OFDM symbol sections; and (4) 11: First to third OFDM symbol sections.

Alternatively, the long CP application section may be preset in the terminal and the base station, and the base station may change the long CP application section using the following information: (1) 00: No change; (2) 01: First OFDM symbol section; (3) 10: Increase in 1 OFDM symbol; and (4) 11: Decrease in 1 OFDM symbol.

Alternatively, the terminal may receive the information on the ratios of the terminals by category, and each terminal may adaptively change the number of OFDM symbols in the long CP application period according to the ratio information.

To this end, the base station may periodically update the ratio information of the first category terminal and the second category terminal and transmit the ratio information to the terminal. Specifically, the base station may determine the ratio information based on the feedback information of the terminal, or may determine the ratio information based on the blind detection.

Thereafter, the second category terminal can transmit data in the long CP application section. The second category terminal can transmit the data to be transmitted in all the OFDM symbols of the long CP application section. In addition, the second category terminal can apply the long CP to the data of the corresponding OFDM symbol and transmit the data to the base station.

Figure 12:
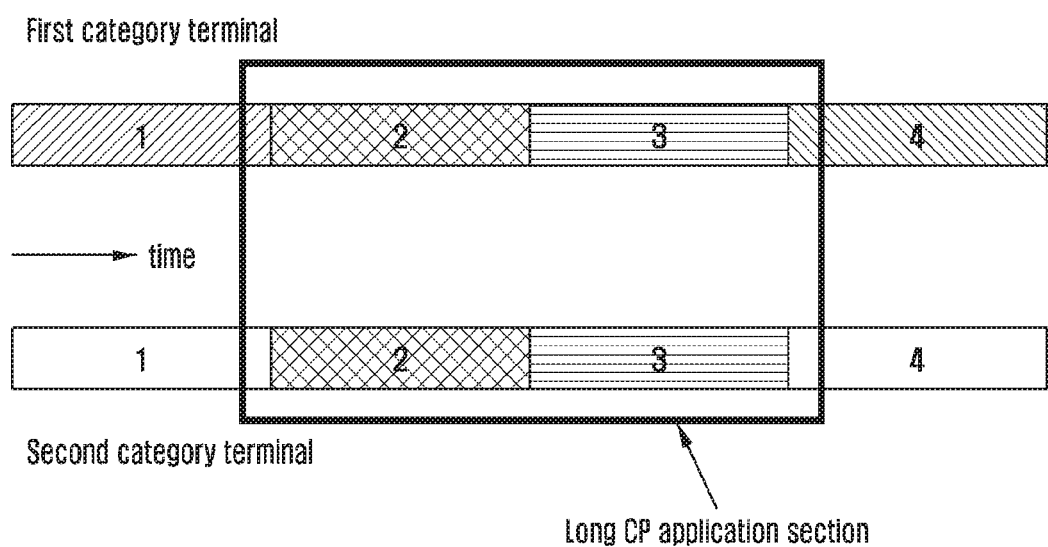
FIG. 12 illustrates a resource mapping method according to still another embodiment of the present disclosure.

FIG. 12 illustrates a resource mapping method according to still another embodiment of the present disclosure.

Referring to FIG. 12, a first category terminal 1210 may transmit data for all OFDM symbols. However, even the first category terminal 1210 may apply the long CP in the long CP application section to transmit data.

On the other hand, a second category terminal 1220 can transmit data only in OFDM symbols 2 and 3 which are the long CP application section and generate and transmit a zero signal in the OFDM symbols 1 and 4. That is, the second category terminal 1220 may not transmit data in the OFDM symbols 1 and 4.

Figure 13:
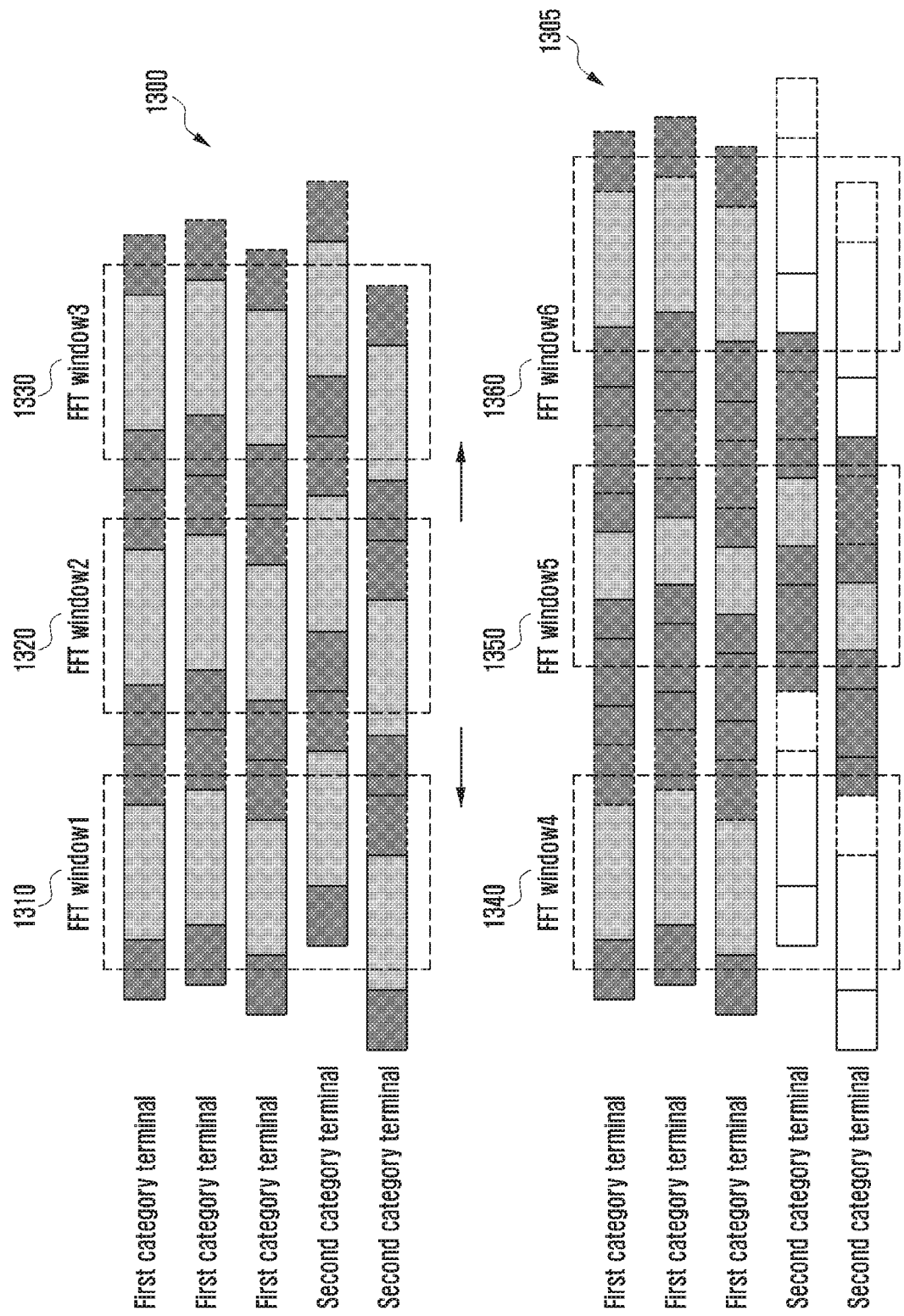
FIG. 13 illustrates a situation where a plurality of terminals transmits an uplink signal in a time domain according to another embodiment of the present disclosure.

FIG. 13 illustrates a situation where a plurality of terminals transmits an uplink signal in a time domain according to another embodiment of the present disclosure.

Referring to FIG. 13, drawing 1300 is the same as reference numeral 800 shown in FIG. 8, and the detailed content thereof will be omitted.

Meanwhile, the second category terminal can add the long CP within an FFT window 5 1350 in drawing 1305 of FIG. 8. Therefore, the signals received from the second category terminal also have only the CP and data signals existing in the FFT window, such that the inter-subcarrier orthogonality can be maintained even after the FFT. Therefore, it is possible to prevent the deterioration in performance in the second category terminal and decrease the influence of interference on the first category terminal.

Further, the first category terminal can also add the long CP within the FFT window 5 1350 to improve reliability.

Figure 14:
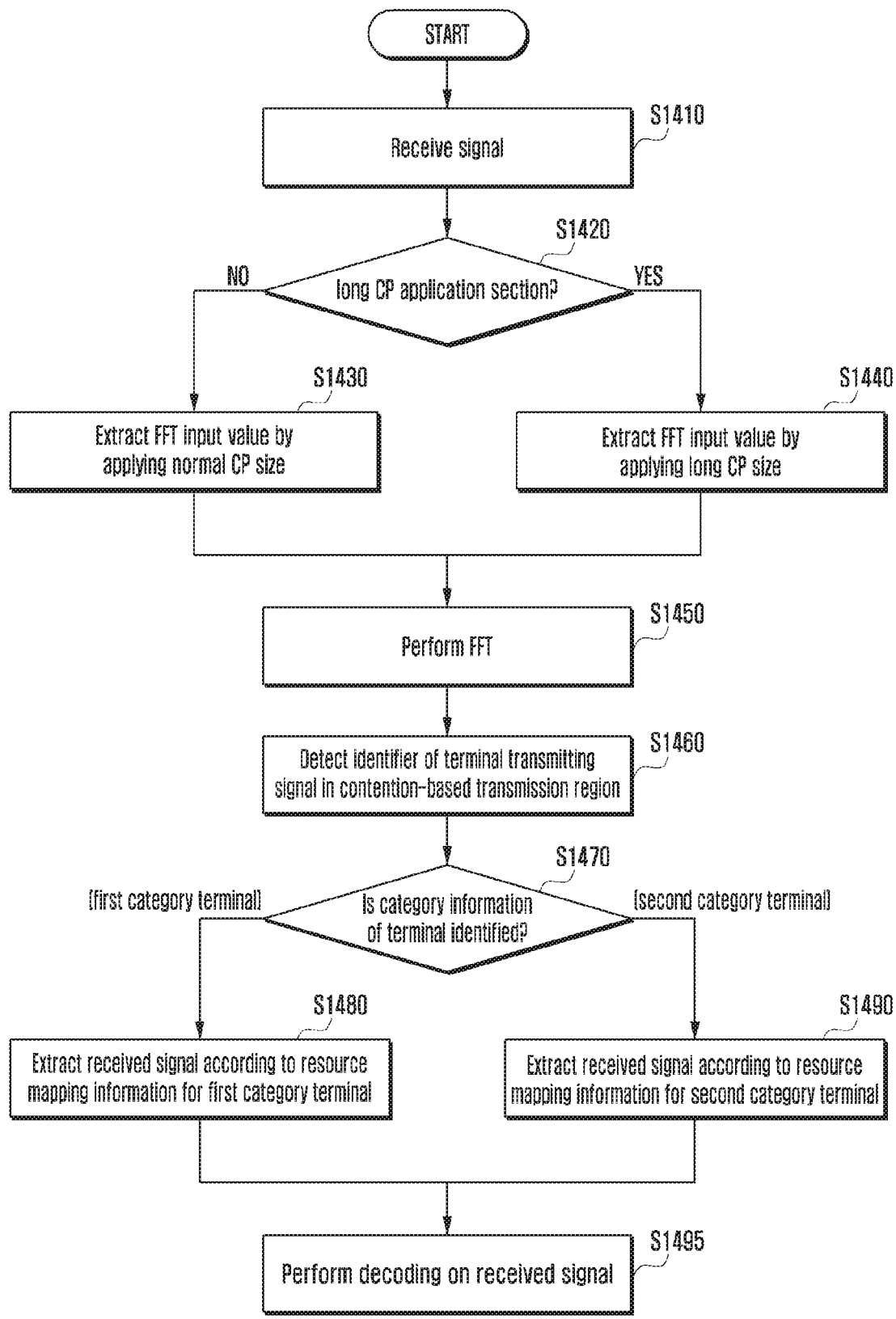
FIG. 14 illustrates a flow chart for an operation of a base station according to another embodiment of the present embodiment.

FIG. 14 illustrates a flow chart for an operation of a base station according to another embodiment of the present embodiment.

Referring to FIG. 14, the base station may receive a signal from the terminal in step S1410.

In step S1420, the base station receiving the signal can identify whether the corresponding OFDM symbol is in a section in which the long CP is applied. If the corresponding OFDM symbol is not included in the section to which the long CP is applied, the base station can extract an FFT input value using the normal CP size in step S1430.

On the other hand, if the corresponding OFDM symbol is included in the predetermined section, the base station can extract the FFT input value by applying the long CP size in step S1440.

The base station extracting the FFT input value may perform the FFT in step S1450.

In step S1460, the base station can detect an identifier of a terminal that transmits a signal in a contention-based transmission region. The base station can detect an identifier of a terminal using a signal received on a common control channel or a data channel.

Thereafter, the base station can identify the category information of the terminal in step S1470. The base station can identify the category information of the terminal by blind detection. Specifically, the correlation of the demodulation reference signal (DMRS) is performed on each OFDM symbol, to which the normal CP and the long CP are applied, using the resource mapping pattern, and if the difference value is equal to or larger than the predetermined value, the terminal can be identified as the second category.

Alternatively, as described above, if the method for determining, by the base station, the category of the terminal using the CQI or RSRP received from the terminal and reporting the determined category of the terminal to the terminal, the base station may know the category of the terminal.

If the terminal is the first category terminal, the base station can extract the received signal according to the resource mapping information on the terminal in step S1480. At this time, the rule for generating the resource mapping information on each terminal may be the information promised between transceivers. Accordingly, the base station can determine the resource mapping information on the terminal and extract the signal transmitted in the pattern. In case of the first category terminal, the base station can extract the received signal according to the resource mapping information in which resources are allocated to all OFDM symbols.

On the other hand, if the terminal is the second category terminal, the base station can extract the received signal according to the resource mapping information on the terminal in step S1490. At this time, the base station can extract the received signal according to the OFDM symbol included in the predetermined section (long CP application section) for the second category terminal. That is, the base station can extract the received signal considering the fact that resources are not allocated to the OFDM symbols not included in the predetermined section (long CP application section).

Thereafter, the base station can perform the decoding on the received signal in step S1495.

Figure 15:
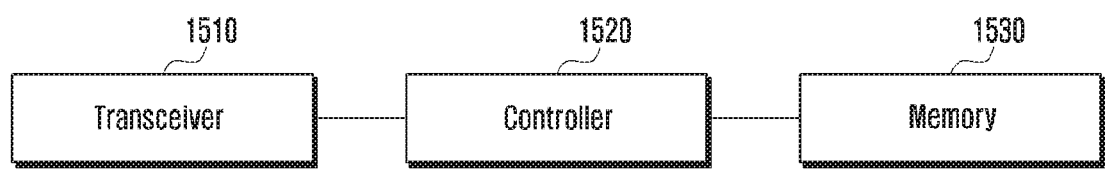
FIG. 15 illustrates a configuration of a terminal according to another embodiment of the present disclosure.

FIG. 15 illustrates a configuration of a terminal according to another embodiment of the present disclosure.

Referring to FIG. 15, the terminal may be configured to include a transceiver 1510, a controller 1520, and a memory (or a storage unit) 1530. For example, when defining a controller in the specification, it may be stated that "the controller may be a circuit, an application-specific integrated circuit or at least one processor."

The transceiver 1510 may transmit and receive signals to and from other network entities. The transceiver 1510 can transmit the signal generated from the controller to the base station and receive the signal from the base station.

The controller 1520 can generate a transmission signal. At this time, the controller 1520 can generate a transmission signal in a frequency domain.

Further, the controller 1520 may identify the category of the terminal. The controller 1520 can determine whether the timing offset value that the terminal can generate may be larger than the CP range, thereby determining the category of the terminal.

If it is determined that the terminal is the first category terminal, the terminal can map resource elements in step S1030. The terminal can map a signal to a resource element of a resource block allocated to the terminal according to the resource mapping information. Specifically, the terminal can map the resource elements in the frequency domain. In this case, the resource mapping information may be referred to as first resource mapping information as the resource mapping information on the first category terminal, and may include information related to patterns of resource elements to be mapped to the first category terminal in the resource block.

The controller 1520 mapping the resource elements can convert the signal into the signal in the time domain by performing inverse fast Fourier transform (IFFT) and then add the normal CP (hereinafter, referred to as a first CP or a general CP) applied to the signal in a time domain. The normal CP may mean a CP having a length within the defined CP range.

The controller 1520 can transmit the generated signal to the base station.

Meanwhile, if it is determined that the terminal is the second category terminal, the controller 1520 can map resource elements. The terminal can map a signal to a resource element of a resource block allocated to the terminal according to the resource mapping information. In detail, the terminal can map a resource element in a frequency domain to a signal. In this case, the resource mapping information may be referred to as second resource mapping information as the resource mapping information on the second category terminal, and may include information related to patterns of resource elements to be mapped to the second category terminal in the resource block.

In this case, a method of not mapping, by a controller 1520, resource elements to a symbol adjacent to a symbol mapped to a resource element so as not to be influenced by signals of neighboring OFDM symbols may be used for the second category terminal. That is, the second category terminal is divided into two groups, the resources are mapped to use odd-numbered OFDM symbols for terminals included in a first group among symbols of resource blocks, and resources may be mapped to use even-numbered OFDM symbols for terminals included in a second group. The detailed content is the same as those described above and therefore will be omitted below.

The controller 1520 mapping the resource elements can perform the inverse fast Fourier transform (IFFT) to convert the signal into the signal in the time domain.

The controller 1520 can identify whether the corresponding OFDM symbol is the OFDM symbol in which the resource element allocated thereto exists.

In the case of the OFDM symbol in which the resource elements to which the corresponding OFDM symbol is allocated exist, the controller 1520 may add the long CP (hereinafter, referred to as a second CP) to the signal in the time domain. At this time, the length of the long CP is set to exceed the CP range, and the timing offset value may be set to be equal to or less than the long CP range. The detailed method for adding a CP is the same as the foregoing methods and therefore will be omitted below.

If the OFDM symbol is an OFDM symbol in which there is no resource element to which the corresponding OFDM symbol is allocated, the controller can generate a zero signal in the corresponding OFDM symbol.

The controller 1520 may reduce the number of zero samples in consideration of the length of the long CP. This is to match the boundaries of the OFDM symbols, and the detailed content thereof are the same as those described above and therefore will be omitted below.

Thereafter, the controller 1520 can transmit the signal to the base station.

Also, according to another embodiment of the present disclosure, the controller 1520 may map the resource elements only in a specific OFDM symbol section for the second category terminal. After performing the IFFT, the controller 1520 can determine whether the corresponding OFDM symbol is the long CP application section. At this time, whether or not the corresponding OFDM symbol is the long CP application section can be performed in both the first category terminal and the second category terminal.

If the corresponding OFDM symbol is not included in the long CP application section, the controller 1520 of the first category terminal can add the normal CP to the signal in the time domain. On the other hand, the controller 1520 of the second category terminal may not transmit data in the corresponding symbol.

If the corresponding OFDM symbol is included in the long CP application section, the controller 1520 may add the long CP to the signal in the time domain. At this time, it is possible to add the long CP to the signals of both the first category terminal and the second category terminal.

The memory 1530 may store the information on the normal CP and the information on the long CP. In addition, the memory 1530 may store the information on the timing offset value that can be generated by the terminal and the information on the range of the CP value. In addition, memory 1530 may store the information generated by the controller 1520 according to the present disclosure and the information received through the transceiver 1510.

Figure 16:
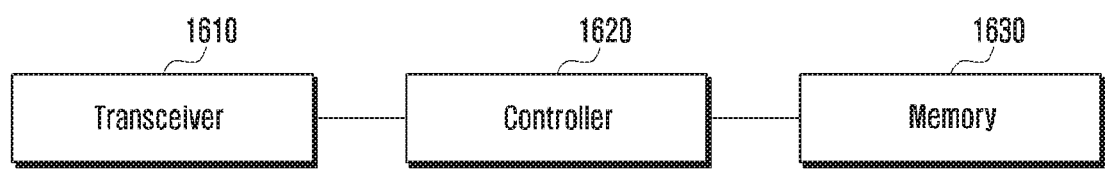
FIG. 16 illustrates a configuration of a base station according to an embodiment of the present embodiment.

FIG. 16 illustrates a configuration of a base station according to an embodiment of the present embodiment.

Referring to FIG. 16, the base station may include a transceiver 1610, a controller 1620, and a memory (or a storage unit) 1630. For example, when defining a controller in the specification, it may be stated that "the controller may be a circuit, an application-specific integrated circuit or at least one processor."

The transceiver 1610 may transmit and receive signals to and from other network entities. The transceiver 1610 may transmit and receive a signal to and from the terminal.

The controller 1620 may transmit and receive a signal to and from the terminal. At this time, the normal CP or the long CP may be added to the signal received from the terminal according to the category of the terminal. The controller 1620 may extract the FFT input value and apply the general CP size to extract the FFT input value. Thereafter, the controller 1620 can perform the FFT.

The controller 1620 can detect the identifier of the terminal that transmits the signal in the contention-based transmission region. The controller 1620 can detect the identifier of the terminal using a signal received on a common control channel or a data channel.

Thereafter, the controller 1620 can identify the category information of the terminal. The controller 1620 can identify the category information of the terminal by the blind detection. Specifically, the correlation of the demodulation reference signal (DMRS) is performed on each even-numbered OFDM symbol or odd-numbered OFDM symbol using the resource mapping pattern for the terminal, and if the difference value is equal to or larger than the predetermined value, the terminal can be identified as the second category.

Alternatively, as described above, if the method for determining, by the controller 1620, the category of the terminal using the CQI or RSRP received from the terminal and reporting the determined category of the terminal to the terminal, the controller 1620 may know the category of the terminal.

If the terminal is the first category terminal, the controller 1620 can extract the received signal according to the resource mapping information on the terminal. At this time, the rule for generating the resource mapping information on each terminal may be the information promised between transceivers. Accordingly, the controller 1620 can determine the resource mapping information on the terminal and extract the signal transmitted in the pattern. In case of the first category terminal, the controller 1620 can extract the received signal according to the resource mapping information in which resources are allocated to all OFDM symbols.

Meanwhile, if the terminal is the second category terminal, the controller 1620 can extract the received signal according to the resource mapping information on the terminal. At this time, the controller 1620 can extract the received signal in consideration of the fact that resources are not allocated to the odd-numbered or even-numbered OFDM symbols for the second category terminal.

Meanwhile, according to another embodiment of the present disclosure, the controller 1620 can receive a signal and identify whether the corresponding OFDM symbol is included in the section to which the long CP is applied. If the corresponding OFDM symbol is not included in the section to which the long CP is applied, the controller 1620 can extract the FFT input value using the normal CP size.

On the other hand, if the corresponding OFDM symbol is included in the predetermined section, the controller 1620 can extract the FFT input value by applying the long CP size.

Thereafter, the controller 1620 can perform the FFT and detect the identifier of the terminal to identify the category information of the terminal. The detailed content is the same as those described above and therefore will be omitted below.

If the terminal is the first category terminal, the controller 1620 can extract the received signal according to the resource mapping information on the terminal. The controller 1620 can extract the received signal considering that the long CP is added in the long CP application section.

Meanwhile, if the terminal is the second category terminal, the controller 1620 can extract the received signal according to the resource mapping information on the terminal. At this time, the controller 1620 can extract the received signal according to the OFDM symbol included in the long CP application section for the second category terminal. That is, the controller 1620 can extract the received signal considering the fact that resources are not allocated to the OFDM symbols not included in the predetermined section (long CP application section).

Further, the controller 1620 may perform the decoding on the received signal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a terminal, comprising:
   generating a signal;
   identifying a category of the terminal based on a timing offset of received signals and a range of a first cyclic prefix (CP);
   mapping the generated signal to resources using resource mapping information determined based on the category of the terminal; and
   transmitting the signal using the mapped resources,
   wherein the resource mapping information corresponds to a second category of the terminal based on the timing offset being larger than the range of the first CP, and
   wherein the resource mapping information corresponding to the second category of the terminal includes one of odd index symbols or even index symbols.

2. The method of claim 1, wherein transmitting the signal further comprises adding a CP to the signal based on the category of the terminal, and
   wherein adding the CP further comprises:
   adding a second CP exceeding the range of the first CP to the signal based on the category of the terminal being the second category; and
   adding the first CP to the signal based on the category of the terminal being a first category in which the timing offset is smaller than the range of the first CP.

3. The method of claim 2, wherein adding the second CP further comprises:
   adding a CP having a length determined based on the timing offset before and after the first CP,
   wherein the resource mapping information is determined based on at least one of an identifier of the terminal or an identifier of a cell.

4. The method of claim 1, wherein the timing offset is determined to be larger than the range of the first CP based on a difference between a first power estimation value of a signal received at a time of an initial connection and a second power estimation value of a currently received signal being larger than a threshold value.

5. The method of claim 1, wherein the timing offset is determined to be larger than the range of the first CP based on a difference between first channel quality information fedback from the terminal at a time of an initial connection and second channel quality information that is most recently fedback from the terminal being larger than a threshold value.

6. A method of a terminal, comprising:
   generating a signal;
   identifying a category of the terminal based on a timing offset of received signals and a range of a first cyclic prefix (CP);
   mapping the generated signal to resources in a first set of predetermined symbols or a second set of predetermined symbols in a slot based on the category of the terminal, wherein a second CP exceeding the range of the first CP is used for the second set of predetermined symbols in case that the category of the terminal is a second category in which the timing offset is larger than the range of the first CP; and
   transmitting the signal using the mapped resources,
   wherein a number of the second set of predetermined symbols in the slot is determined based on a ratio of terminals of a first category to terminals of the second category.

7. The method of claim 6, further comprising:
   adding the second CP in the predetermined symbols,
   wherein the timing offset is determined to be larger than the range of the first CP based on a difference between a first power estimation value of a signal received at a time of an initial connection and a second power estimation value of a currently received signal being larger than a first threshold value or a difference between first channel quality information fedback from the terminal at the time of the initial connection and second channel quality information that is most recently fedback from the terminal being larger than a second threshold value.

8. A method of a base station, comprising:
   receiving signals from a terminal;
   identifying a category of the terminal; and
   decoding the received signals mapped to resources according to resource mapping information determined based on the category of the terminal,
   wherein the resource mapping information corresponds to a second category of the terminal based on a timing offset being larger than a range of a first cyclic prefix (CP), and
   wherein the resource mapping information corresponding to the second category of the terminal includes one of odd index symbols or even index symbols.

9. The method of claim 8, wherein the signals include a second CP exceeding the range of the first CP based on the category of the terminal being a first category.

10. The method of claim 8, wherein identifying the category of the terminal further comprises:
    identifying the category of the terminal based on a blind detection using the signals received from the terminal, and
    wherein decoding the received signals further comprises decoding the received signals based on symbols to which the resources are not mapped based on the category of the terminal being the second category.

11. A terminal, comprising:
a transceiver; and
at least one processor configured to:
generate a signal,
identify a category of the terminal based on a timing offset of received signals and a range of a first cyclic prefix (CP),
map the generated signal to resources using resource mapping information determined based on the category of the terminal, and
transmit the signal using the mapped resources,
wherein the resource mapping information corresponds to a second category of the terminal based on the timing offset being larger than the range of the first CP, and
wherein the resource mapping information corresponding to the second category of the terminal includes one of odd index symbols or even index symbols.

12. The terminal of claim 11, wherein the at least one processor is further configured to:
add a CP to the signal based on the category of the terminal;
add a second CP exceeding the range of the first CP to the signal based on the category of the terminal being the second category; and
add the first CP to the signal based on the category of the terminal being a first category in which the timing offset is smaller than the range of the first CP.

13. The terminal of claim 12, wherein the at least one processor is further configured to add a CP having a length determined based on the timing offset before and after the first CP, and
wherein the resource mapping information is determined based on at least one of an identifier of the terminal or an identifier of a cell.

14. The terminal of claim 11, wherein the timing offset is determined to be larger than the range of the first CP based on a difference between a first power estimation value of a signal received at a time of an initial connection and a second power estimation value of a currently received signal being larger than a threshold value.

15. The terminal of claim 11, wherein the timing offset is determined to be larger than the range of the first CP based on a difference between first channel quality information fedback from the terminal at a time of an initial connection and second channel quality information that is most recently fedback from the terminal being larger than a threshold value.

16. A terminal, comprising;
a transceiver; and
at least one processor configured to:
generate a signal,
identify a category of the terminal based on a timing offset of received signals and a range of a first cyclic prefix (CP),
map the generated signal to resources in a first set of predetermined symbols or a second set of predetermined symbols in a slot based on the category of the terminal, wherein a second CP exceeding the range of the first CP is used for the second set of predetermined symbols in case that the category of the terminal is a second category in which the timing offset is larger than the range of the first CP; and
transmit the signal using the mapped resources,
wherein a number of the second set of predetermined symbols in the slot is determined based on a ratio of terminals of a first category to terminals of the second category.

17. The terminal of claim 16, wherein the at least one processor is configured to:
add the second CP in the predetermined symbols,
wherein the timing offset is determined to be larger than the range of the first CP based on a difference between a first power estimation value of a signal received at a time of an initial connection and a second power estimation value of a currently received signal being larger than a first threshold value or a difference between first channel quality information fedback from the terminal at the time of the initial connection and second channel quality information that is most recently fedback from the terminal being larger than a second threshold value.

18. A base station, comprising:
a transceiver; and
at least one processor configured to:
receive signals from a terminal,
identify a category of the terminal, and
decode the received signals mapped to resources according to resource mapping information determined based on the category of the terminal,
wherein the resource mapping information corresponds to a second category of the terminal based on a timing offset being larger than a range of a first cyclic prefix (CP), and
wherein the resource mapping information corresponding to the second category of the terminal includes one of odd index symbols or even index symbols.

19. The base station of claim 18, wherein the received signals include a second CP exceeding the range of the first CP based on the category of the terminal being a first category.

20. The base station of claim 18, wherein the at least one processor is further configured to:
identify the category of the terminal based on a blind detection using the signals received from the terminal; and
decode the received signals based on symbols to which the resources are not mapped based on the category of the terminal being the second category.

* * * * *